US012729013B2

(12) United States Patent
Sartorius et al.

(10) Patent No.: US 12,729,013 B2
(45) Date of Patent: Sep. 8, 2026

(54) HEIGHT ADJUSTMENT DEVICES, SYSTEMS INCLUDING THE SAME, AND METHODS FOR CREATING VERTICAL CLEARANCE BETWEEN WINGS OF ADJACENT AIRCRAFT

(71) Applicant: The Boeing Company, Arlington, VA (US)

(72) Inventors: Thomas Skyler Sartorius, San Luis Obispo, CA (US); Robert E. Grip, Rancho Palos Verdes, CA (US); Eric Daniel Davidson, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/053,231

(22) Filed: Feb. 13, 2025

(65) Prior Publication Data

US 2026/0233857 A1 Aug. 13, 2026

(51) Int. Cl.

*B64F 1/36* (2024.01)
*B64F 1/223* (2024.01)
*G08G 5/80* (2025.01)

(52) U.S. Cl.

CPC ................ *B64F 1/36* (2013.01); *B64F 1/223* (2024.01); *G08G 5/80* (2025.01)

(58) Field of Classification Search

CPC . B64F 1/225; B64F 1/223; B64C 1/22; B64C 1/36; B64C 1/00; G08G 5/80
See application file for complete search history.

(56) References Cited

U.S. PATENT DOCUMENTS

| | | | | |
|---|---|---|---|---|
| 1,751,721 A * | 3/1930 | Bellmann | E04H 6/44 | 414/233 |
| 1,843,640 A * | 2/1932 | Jackson | B64F 1/36 | 404/1 |
| 3,571,990 A * | 3/1971 | Rossman | B64F 1/00 | 52/33 |
| 3,756,419 A * | 9/1973 | Dean | B64F 1/222 | 414/241 |

(Continued)

FOREIGN PATENT DOCUMENTS

| | | | |
|---|---|---|---|
| FR | 1524844 A * | 4/1968 | |
| GB | 2605406 A * | 10/2022 | B66F 7/20 |

*Primary Examiner* — Ashesh Dangol
*Assistant Examiner* — Cindi M Curry
(74) *Attorney, Agent, or Firm* — Kolitch Romano Dascenzo Gates LLP

(57) ABSTRACT

Height adjustment devices can temporarily and selectively adjust a height of at least a first portion of a first aircraft while the first aircraft is engaged with the height adjustment device by tilting, lifting, and/or lowering the first aircraft and/or a second, adjacent aircraft. The height adjustment device is at least partially integrated into an apron of an airport where the aircraft are located, and the height adjustment device is configured to guide the first aircraft to transition the first aircraft from an entering position to a final position. The height adjustment device may be configured to position the first aircraft in a level orientation in the final position and prevent interference with the adjacent aircraft while the first aircraft travels such that a wing of the first aircraft passes by an adjacent wing of the adjacent aircraft.

18 Claims, 22 Drawing Sheets

(56) References Cited

U.S. PATENT DOCUMENTS

| | | | | |
|---|---|---|---|---|
| 2014/0103161 | A1* | 4/2014 | Zhang | B64F 1/08 244/114 R |
| 2017/0174358 | A1* | 6/2017 | Landers | G08G 5/26 |
| 2018/0301045 | A1* | 10/2018 | Pesik | B64F 1/002 |
| 2019/0100420 | A1* | 4/2019 | Perlstein | G05G 23/00 |
| 2023/0322408 | A1* | 10/2023 | McGeehan | B64F 1/227 244/50 |

* cited by examiner

HEIGHT ADJUSTMENT DEVICES, SYSTEMS INCLUDING THE SAME, AND METHODS FOR CREATING VERTICAL CLEARANCE BETWEEN WINGS OF ADJACENT AIRCRAFT

FIELD

The present disclosure relates to height adjustment devices, systems including the same, and methods for creating vertical clearance between the wings of adjacent aircraft, more particularly for large span aircraft parked near each other.

BACKGROUND

While larger wingspan aircraft may be more efficient, airport gate constraints limit the span of aircraft. For example, FIG. 1 illustrates an overhead view of adjacent gates 10 at an airport. Large span aircraft 14 are superimposed into respective gates 10, illustrating respective spacing if such aircraft 14 were to be parked next each other. Specifically, a wingspan 16 of each aircraft 14 is greater than a width 18 of each gate 10, which would result in interference between adjacent wings 20 of adjacent aircraft 14, as indicated by interference points 22. Thus, such large span aircraft may be unable to utilize these airport gates due to the sizing of their wingspans relative to the gate width.

However, various factors such as airports' investment in their current gate spacing arrangements and/or space constraints limit the willingness and/or ability of airports to expand or increase spacing at adjacent gates to accommodate large span aircraft. Attempts have been made to overcome these spacing limitations, such as with aircraft having winglets or wing folds. However, wing folds are heavy and expensive, and create new issues and challenges with respect to certification, operation, and reliability.

Furthermore, folding wing tips create an increased complexity of the construction of the wing, increased manufacturing and maintenance costs, and have limited success because only a limited amount of the wing can be folded. Winglets create an increased manufacturing complexity and cost, and are less desirable aerodynamically and structurally than simply increasing the span of a planar wing. None of the existing solutions, therefore, are entirely satisfactory.

SUMMARY

The present disclosure concerns systems and designs to enable larger span aircraft to utilize existing airport gate spacing and effectively enabling closer spacing of large span aircraft in narrow airport gates. Disclosed height adjustment devices tilt, lift, and/or lower an incoming aircraft and/or an adjacent aircraft so that the wings of those aircraft have sufficient vertical clearance to allow the aircraft to pass each other without interference and park at gates spaced more closely than the wingspan.

According to the present disclosure, a height adjustment device may be configured to temporarily and selectively adjust a height of at least a portion of an aircraft while the aircraft is engaged with the height adjustment device. The height adjustment device is at least partially integrated into an apron of an airport where the aircraft is located, and the height adjustment device is configured to guide the aircraft to transition the aircraft from an entering position to a final position. The height adjustment device may be configured to position the aircraft in a level orientation in the final position and prevent interference with an adjacent aircraft while the aircraft travels such that a first wing of the aircraft passes by an adjacent wing of the adjacent aircraft.

Systems for close gate spacing of large span aircraft according to the present disclosure may include a plurality of height adjustment devices each configured to temporarily and selectively adjust a height of at least a first portion of a respective aircraft while the respective aircraft is engaged with a respective height adjustment device of the plurality of height adjustment devices. The plurality of height adjustment devices may be spaced apart in a plurality of different locations of an airport, and each respective height adjustment device may be at least partially integrated into an apron of an airport where the aircraft is located. Systems also may include a plurality of tugs, with each tug being configured to position a respective aircraft on or in a respective height adjustment device of the plurality of height adjustment devices. Systems also may include at least one aircraft sensor positioned on or within the aircraft, with the at least one aircraft sensor being configured to measure and/or provide information regarding the height, orientation, and/or position of one or more points on the aircraft, and/or to measure or provide information regarding a distance between one or more points on the aircraft and an adjacent aircraft or other object.

Methods according to the present disclosure may include adjusting a height of at least a portion of a first aircraft via a height adjustment device, wherein the height adjustment device is at least partially integrated into an apron of an airport where the aircraft is located, translating the first aircraft with respect to a second aircraft while the first aircraft is engaged with the height adjustment device, and leveling the first aircraft after the translating the first aircraft with respect to the second aircraft. The first aircraft is tilted, raised, and/or lowered while the first aircraft is moved with respect to the second aircraft. Generally, the translating the first aircraft with respect to the second aircraft is performed until a first wing of the first aircraft is moved past a second wing of the second aircraft.

DESCRIPTION

Generally, in the figures, elements that are likely to be included in a given example are illustrated in solid lines, while elements that are optional to a given example or that correspond to one or more specific examples are illustrated in broken lines. However, elements that are illustrated in solid lines are not essential to all examples of the present disclosure, and an element shown in solid lines may be omitted from a particular example without departing from the scope of the present disclosure.

Figure 1:
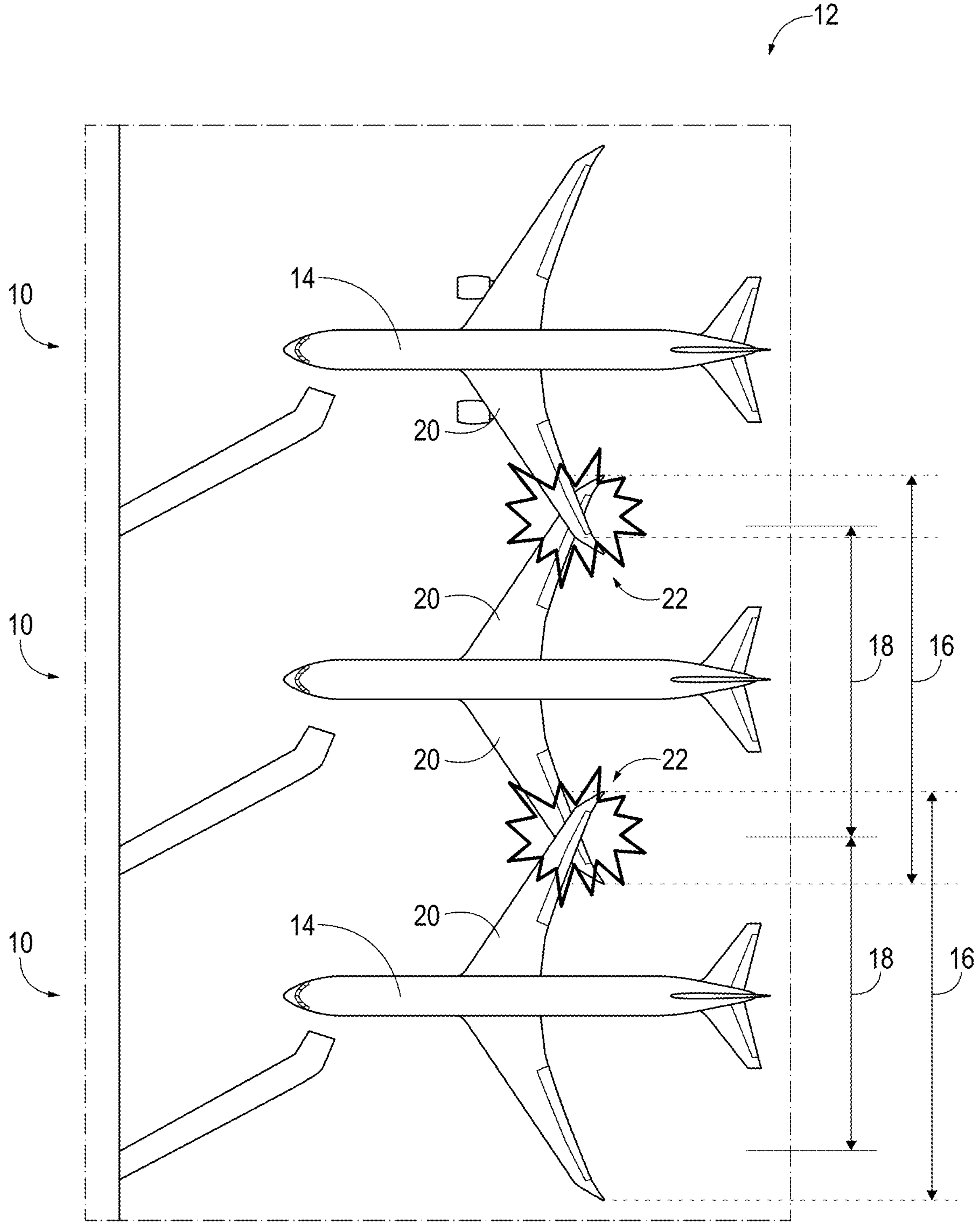
FIG. 1 is a top plan view of a prior art airport configuration that would preclude large span aircraft parked next to each other.
Figure 2:
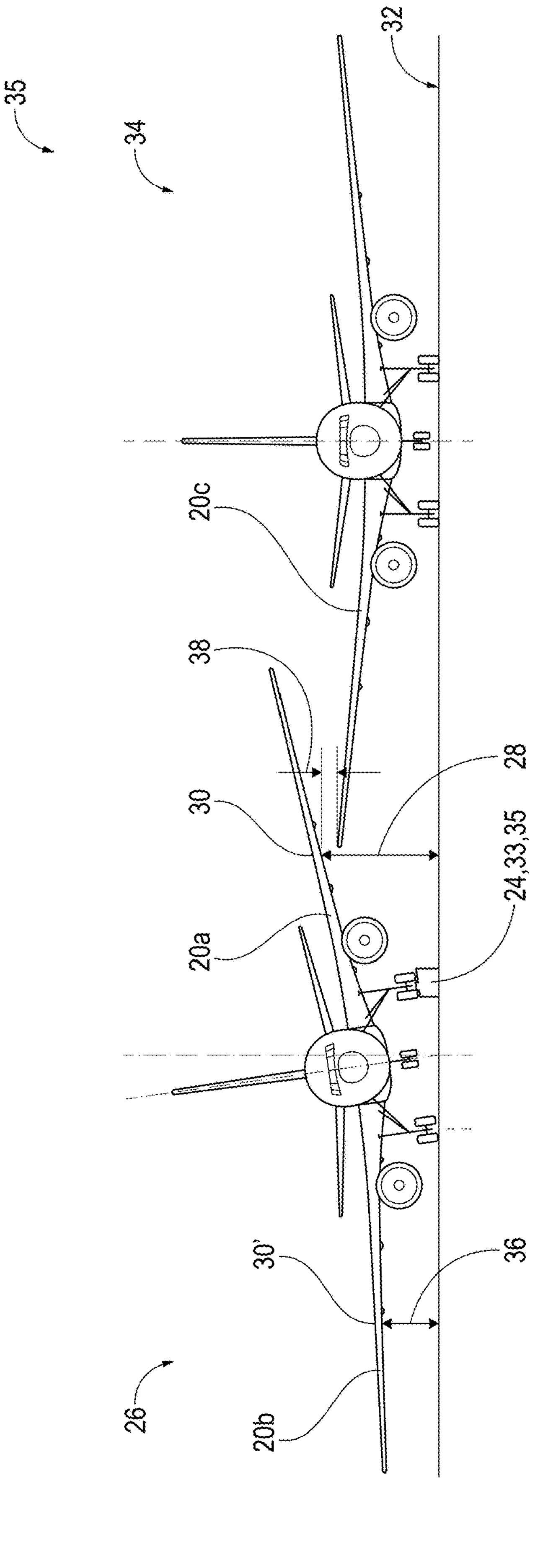
FIG. 2 is a front elevation schematic representation of a first aircraft engaged with a height adjustment device, according to the present disclosure, in which the height adjustment device tilts the first aircraft.
Figure 3:
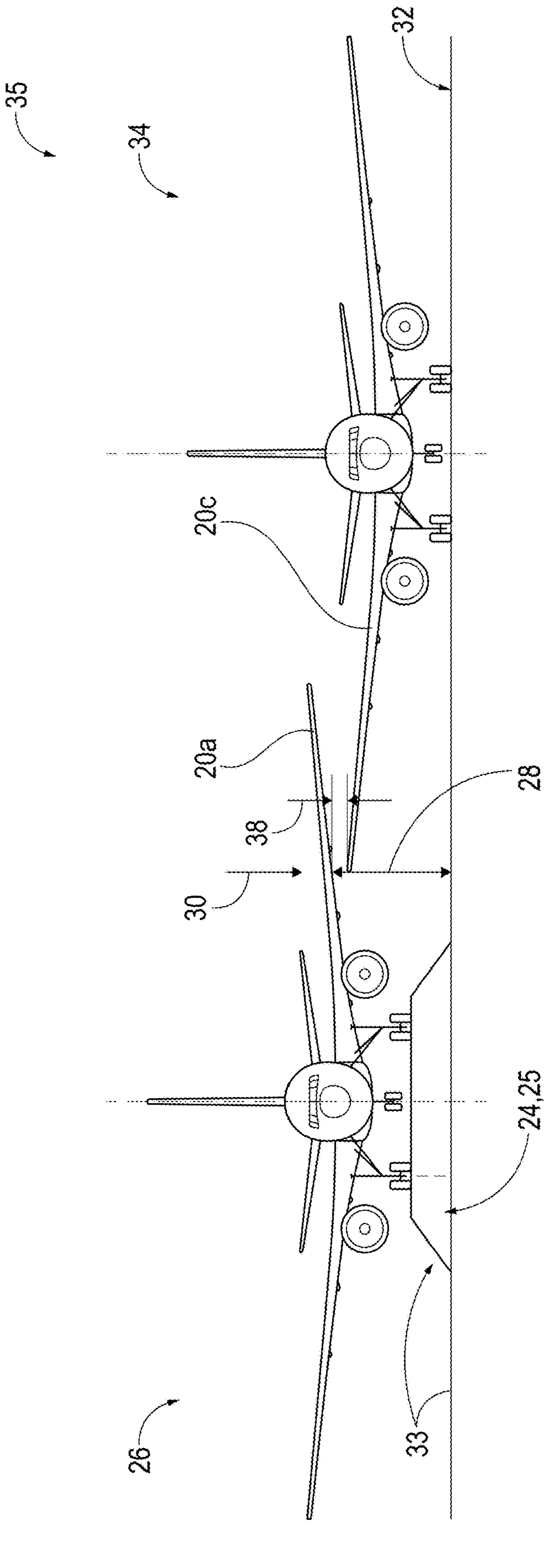
FIG. 3 is a front elevation schematic representation of a first aircraft engaged with a height adjustment device, according to the present disclosure, in which the height adjustment device lifts the first aircraft.
Figure 4:
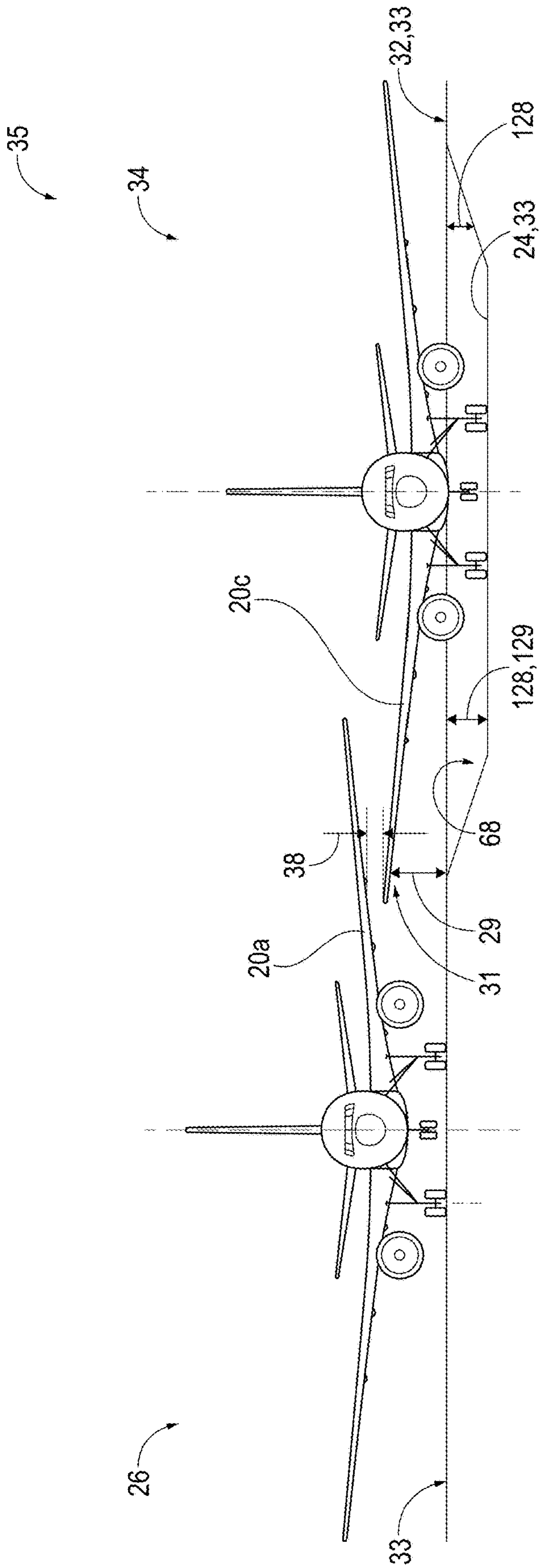
FIG. 4 is a front elevation schematic representation of a second aircraft engaged with a height adjustment device, according to the present disclosure, in which the height adjustment device lowers the second aircraft.

FIGS. 2-4 schematically represent the use of height adjustment devices 24 that are at least partially integrated into airport infrastructure and/or an apron 33 of an airport 35 where aircraft 26, 34 are located. Height adjustment devices 24 are configured to temporarily and selectively adjust a height of at least a portion of an aircraft (e.g., a first aircraft 26 and/or a second aircraft 34) while the aircraft is engaged with height adjustment device 24. For example, height adjustment device 24 may be configured to adjust a vertical distance 28 between a point 30 on wing 20*a* of first aircraft 26 and a baseline level of a ground surface 32 or a floor surface on which at least a portion of second aircraft 34 is positioned when first aircraft 26 is engaged with height adjustment device 24, such as by tilting first aircraft 26 (e.g., lifting one side of the aircraft, as shown in FIG. 2), lifting first aircraft 26 (e.g., lifting both sides of the aircraft, as shown in FIG. 3), and/or lowering one or both sides of first aircraft 26 with respect to second aircraft 34 (or vice versa, as shown in FIG. 4). Additionally or alternatively, height adjustment device 24 may be configured to adjust a vertical distance 29 between a point 31 on wing 20*c* of second aircraft 34 and the baseline level of ground surface 32 on which at least a portion of first aircraft 26 is positioned when second aircraft 34 is engaged with height adjustment device 24, such as by tilting second aircraft 34, lifting second aircraft 34, and/or lowering second aircraft 34 with respect to first aircraft 26 (FIG. 4). Thus, as shown in FIGS. 2-4, one or both adjacent wings of adjacent aircraft may be temporarily lifted, lowered, and/or tilted such that first aircraft 26 may move past or be moved past second aircraft 34 (or vice versa) in situations where wings 20 of first aircraft 26 (e.g., wing 20*a*) and second aircraft 34 (e.g., wing 20*c*) would otherwise interfere with each other and prevent aircraft 26, 34 from moving past one another. To accomplish this, height adjustment device 24 may be configured to tilt, lift, and/or lower first aircraft 26 such that wing 20*a* of first aircraft 26 is vertically offset from wing 20*c* of second aircraft 34 (e.g., by vertical offset 38) while first aircraft 26 is engaged with height adjustment device 24.

In some examples, height adjustment device 24 (such as shown in FIG. 2) is configured to tilt first aircraft 26, thereby increasing vertical distance 28 between point 30 on one wing (e.g., wing 20*a*) and ground surface 32, while decreasing a vertical distance 36 between a corresponding point 30' on opposite wing 20*b* and ground surface 32. The location of point 30 along the length of wing 20 may vary depending on the geometry of the aircraft and the particular implementation of height adjustment device(s) 24 used. Examples of height adjustment device 24 may be configured to tilt first aircraft 26 at a tilt angle of 0 degrees, up to about 1 degree, up to about 2 degrees, up to about 3 degrees, up to about 4 degrees, up to about 5 degrees, up to about 6 degrees, up to about 7 degrees, up to about 8 degrees, up to about 9 degrees, and/or up to about 10 degrees. Larger tilt angles may be utilized in some examples, depending on the type of aircraft involved and the situational requirements. For example, in cases involving parking short-span fighter jets on an aircraft carrier, higher tilt angles up to 45 degrees or more may be used. Lower tilt angles may be sufficient in some situations, such as when an incoming aircraft does not need to clear winglets of an adjacent aircraft. Tilting may be accomplished, for example, via height adjustment devices 24 in the form of a ramp, hill, mound, or other projection 25 built into apron 33 and extending upward away from the baseline level of ground surface 32. In some examples, ramp 25 may be removably positioned within an indent formed in apron 33 of the airport. In some examples, tilting the aircraft may be accomplished by positioning one side of the aircraft on height adjustment device 24, while the other side of the aircraft is positioned on the baseline level of ground surface 32. Additionally or alternatively, tilting the aircraft (and changing the tilt angle as the aircraft is translated) may be accomplished by the shape of height adjustment device 24. For example, as the aircraft is rolled onto a first angled portion of a ramp (e.g., first angled portion 74 shown in the example of FIG. 21), the tilt angle may increase as the landing gear moves further along the first angled portion. Then, the tilt angle may be substantially constant as the aircraft rolls along a level portion of height adjustment device 24 (e.g., level portion 78 in the example shown in FIG. 21). Finally, the tilt angle may decrease gradually as the aircraft rolls down a second angled portion of the ramp (e.g., second angled portion 76 in the example shown in FIG. 21), until the aircraft may be rolled off the ramp and onto the baseline level of ground surface 32. The impact of other shapes and configurations of height adjustment devices 24 disclosed herein on the tilt angle of aircraft engaged with the height adjustment device will be apparent to those of ordinary skill in the art.

The maximum tilt angle may be limited by, or influenced by, passenger comfort or tolerance in the case of height adjustment devices 24 used with passenger aircraft. Height adjustment device 24 tilts first aircraft 26 through a range of different tilt angles in some examples. In other examples of height adjustment device 24, height adjustment devices 24 may be configured to adjust the overall height of first aircraft 26 without tilting it, such that vertical distances 28, 36 of wings 20*a*, 20*b* may be substantially equal when first aircraft 26 is engaged with height adjustment device 24, while in still other examples, height adjustment device 24 may both tilt and lift or lower first aircraft 26 and/or second aircraft 34. For example, as shown in FIG. 3, height adjustment device 24 may be configured to elevate the entire aircraft relative to ground surface 32 or other floor surface supporting the aircraft, such as via one or more jacks or lifts configured to vertically lift a portion of first aircraft 26 above the baseline level of ground surface 32 (or another floor surface) supporting the aircraft, and/or via a projection, hill, ramp, or mound 25 integrated into apron 33. In some examples, an aircraft may drive onto height adjustment device 24 in a level configuration in which height adjustment device 24 is substantially flush with ground surface 32, then height adjustment device 24 may be actuated to lift the aircraft above ground surface 32, then the aircraft may drive forward while in engagement with height adjustment device 24 until it clears a neighboring aircraft, and then height adjustment device 24 may be lowered with respect to ground surface 32 to lower aircraft back down to level with ground surface 32. Height adjustment devices 24 may include one or more mechanical stops to prevent the aircraft from falling off height adjustment device 24 when the aircraft is engaged with height adjustment device 24 (e.g., while raising and lowering the aircraft, and/or while the aircraft drives along or is moved along height adjustment device 24).

Additionally or alternatively, as shown in FIG. 4, height adjustment device 24 may be configured to lower the entire aircraft (or at least a portion of the aircraft sufficient to create the desired vertical clearance between adjacent wings) relative to a baseline level of ground surface 32 or other floor surface supporting the aircraft, such as via a trench, trough, recess, or valley 68 integrated into apron 33. At least a portion of the aircraft may be positioned within trench 68 when the aircraft is engaged with this example of height adjustment device 24. In some examples, trench 68 is configured to position the aircraft at a lower elevation (e.g., at a level below the baseline level of ground surface 32) in a final position than the aircraft was positioned at in an entry position before engagement with height adjustment device 24. In other words, the aircraft may be parked within trench 68 at the airport gate. Alternatively, in some examples, the aircraft may move through trench 68 long enough to safely clear adjacent wings of other aircraft, and then be parked out of trench 68 (e.g., at the baseline level of ground surface 32) when it reaches the gate. To effectively lower the height of the aircraft with respect to ground surface 32, trench 68 may have a depth 128. Depth 128 may vary across trench 68, as shown in FIG. 4. For example, trench 68 may have tapered sides such that depth 128 gradually increases from ground surface 32 (e.g., a depth of 0) to a maximum depth 129. Disclosed trenches 68 may have a range of suitable maximum depths 129, which may range from a few inches to a few feet (e.g., up to 3 to 5 feet). Maximum depth 129 may be selected depending on the size of the aircraft and/or depending on a difference in sill heights between two different aircraft. Additionally or alternatively, maximum depth 129 may be selected to accommodate on a full tire radius of the aircraft landing gear.

Trench 68 may have a footprint or surface area positioned lower than a surrounding ground or floor surface (e.g., lower than the baseline level of ground surface 32). In some examples, the footprint or surface area of trench 68 is large enough to receive at least one truck of at least one landing gear 60 of the aircraft, and in some examples, the footprint or surface area of trench 68 is large enough to receive all the landing gear of the aircraft. Height adjustment device 24 may include a removable cover configured to be positioned substantially flush with the baseline level of ground surface 32, to cover trench 68 during times when height adjustment device 24 is not needed. Additionally or alternatively, trenches 68 may include a drainage system, heater, and/or blower to prevent the trenches being filled with rain, ice, or snow and/or to remove accumulated rain, ice, or snow. In some examples, height adjustment device 24 may be adjustable such that height adjustment device 24 is configured to adjust the aircraft to a plurality of different heights. For example, one or more jacks or lifts may be combined with ramps, mounds, or troughs integrated into apron 33 of airport 35 to provide adjustable heights of aircraft engaged with height adjustment devices 24. Additionally or alternatively, height adjustment device 24 may include a mobile ramp positioned within trench 68 and/or an integral ramp formed in or on trench 68 formed in apron 33 of the airport. The ramp may be configured to be selectively moved up and down within trench 68. Thus, in some examples, a bottom elevation of trench 68 is adjustable, such as via a jack, jack screws, a lift, a steel plate, and/or a ramp positioned within trench 68.

Figure 18:
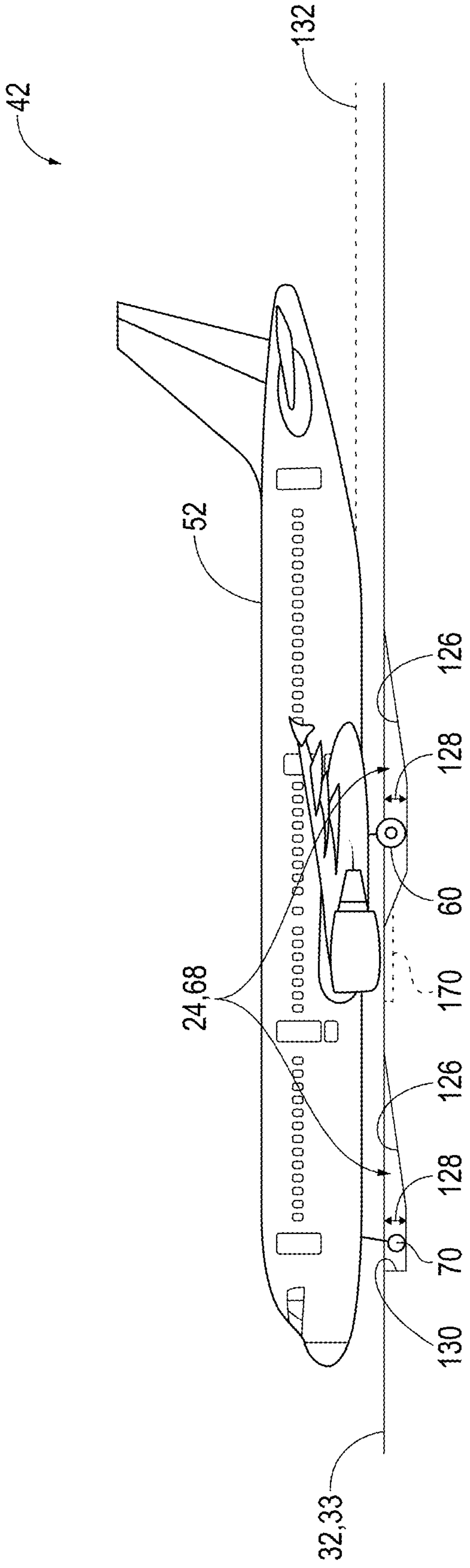
FIG. 18 is a side elevation view of an example of a height adjustment device according to the present disclosure.
Figure 20:
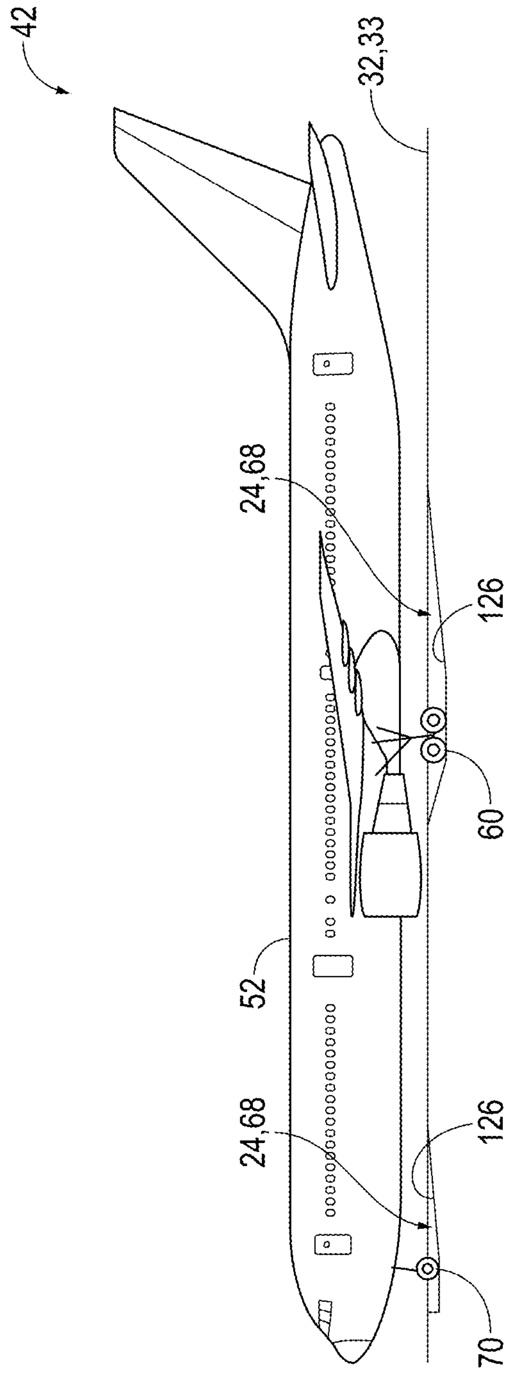
FIG. 20 is a side elevation view of an example of a height adjustment device according to the present disclosure.

With continued reference to FIGS. 2-4, various examples of height adjustment device 24 may be configured to lift or lower both a right side and a left side of the aircraft while the aircraft is engaged with height adjustment device 24, tilt one side of the aircraft while the aircraft is engaged with height adjustment device 24, and/or tilt both sides of the aircraft while the aircraft is engaged with height adjustment device 24. Height adjustment device 24 is generally configured to provide sufficient vertical clearance to allow the aircraft to park at an airport gate that spaced more closely to an adjacent airport gate than a wingspan of the aircraft. As will be understood by those skilled in the art (and as best seen in FIGS. 18 and 20), ramps 25 and trenches 68 may be tapered with respect to the baseline level of ground surface 32 for smooth engagement with aircraft. Height adjustment device 24 may be configured to accommodate different types of aircraft with different lengths of landing gear. Additionally or alternatively, height adjustment device 24 may be used to even out or otherwise adjust (e.g., raise or lower) a sill height of various different types of aircraft such that ground surface equipment and crew may access the cargo area of different sizes of aircraft from a common height (e.g., as adjusted by height adjustment device 24).

To engage height adjustment device 24 with the aircraft, the aircraft generally may be positioned on or in height adjustment device 24, such as by driving the aircraft onto or into height adjustment device 24, or tugging or towing the aircraft onto or into height adjustment device 24. In some examples, height adjustment device 24 is configured to passively engage and align the aircraft, and in some examples, height adjustment device 24 is configured to actively engage and align the aircraft. For example, height adjustment device 24 may be configured to laterally align the main landing gear of the aircraft to passively ensure that the aircraft is positioned correctly with respect to height adjustment device 24. In a specific example, height adjustment device 24 may include a plurality of rollers having a longitudinal axis aligned with a direction of travel of a truck of the main landing gear of the aircraft, with the plurality of rollers being configured to laterally align the truck of the landing gear with a desired location, or within angled wall guides of height adjustment device 24.

In some examples, height adjustment device 24 is autonomous, such that it may be positioned and/or adjusted without requiring user input. For example, height adjustment device 24 may be configured to sense incoming aircraft, and actively position the aircraft with respect to height adjustment device 24 for proper engagement with the aircraft, and pull the aircraft onto, into, or otherwise in engagement with height adjustment device 24. Additionally or alternatively, height adjustment device 24 may include at least one motor configured to operate (e.g., adjust a height of) height adjustment device 24. In some examples, height adjustment device 24 is configured to actively engage aircraft 26 by effectively grabbing one or more wheels of the landing gear, and pulling the aircraft into engagement with height adjustment device 24 without requiring the use of aircraft power.

Figure 6:
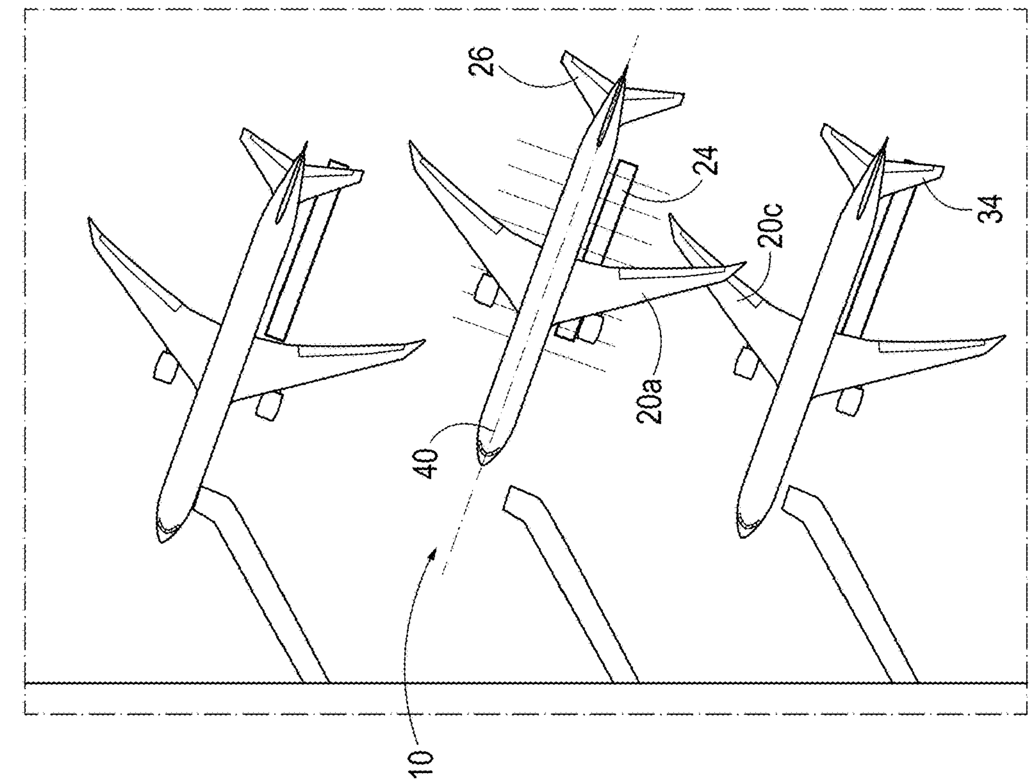
FIG. 6 is a top plan schematic representation of a first aircraft being translated past an adjacent aircraft via presently disclosed height adjustment devices.
Figure 5:
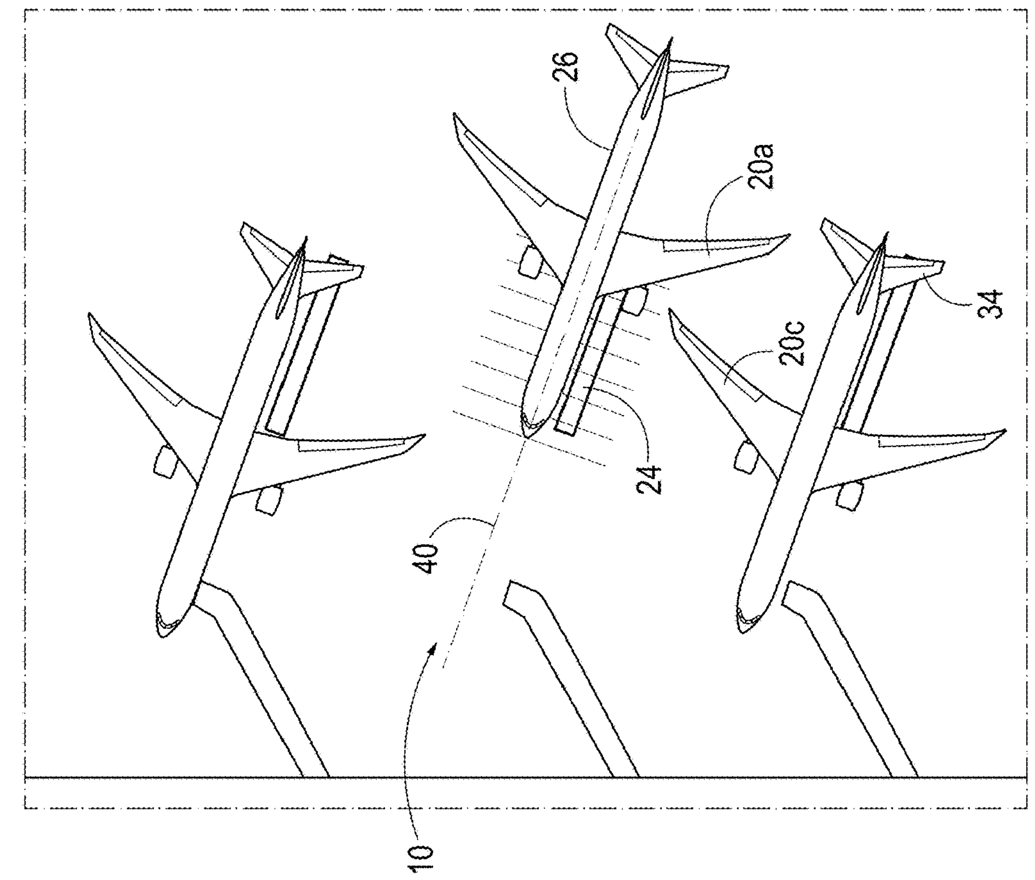
FIG. 5 is a top plan schematic representation of a first aircraft in an entering position before entering an airport gate positioned between adjacent aircraft, while the first aircraft is engaged with a height adjustment device according to the present disclosure.
Figure 7:
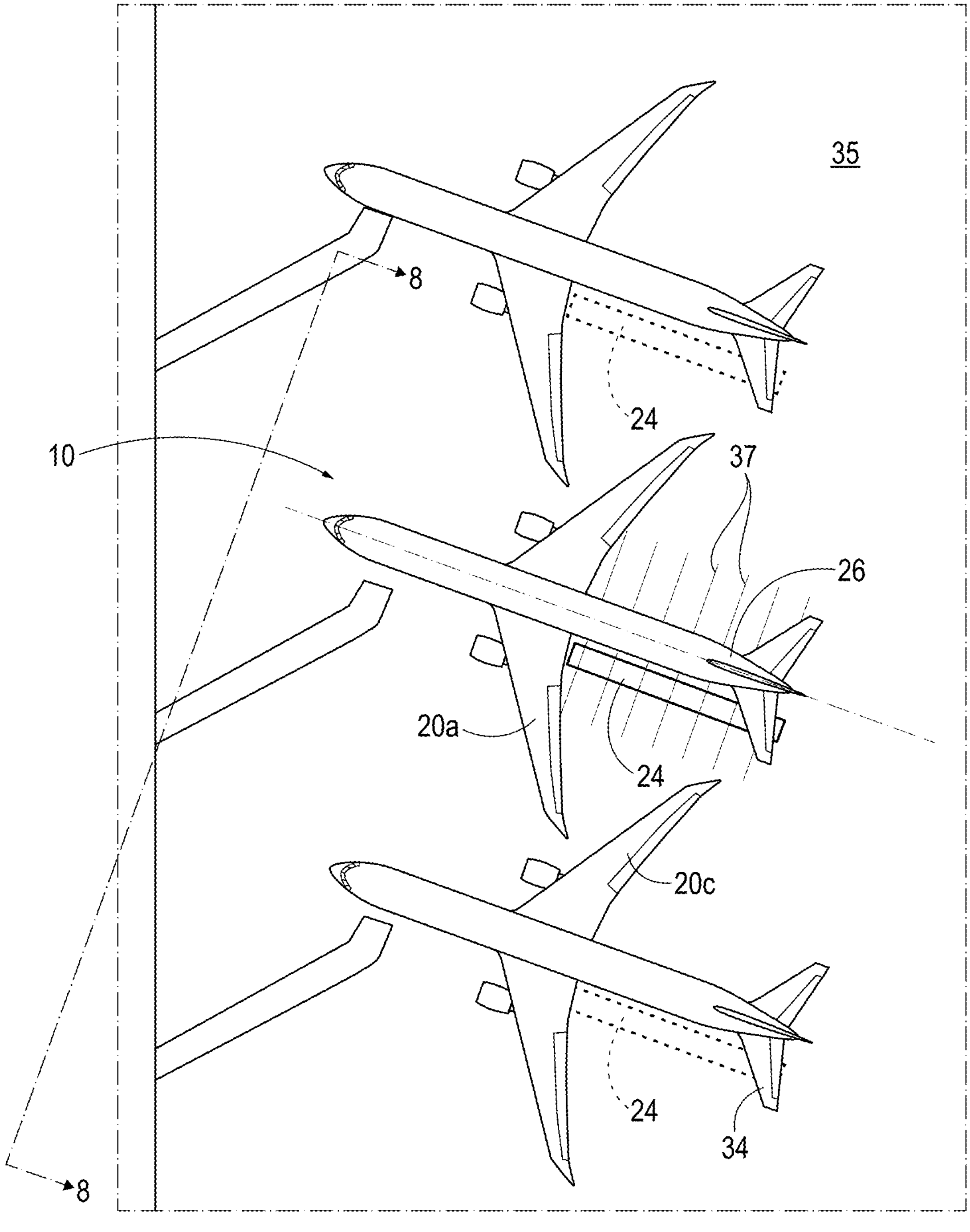
FIG. 7 is a top plan schematic representation of a first aircraft in a final position after entering an airport gate positioned between adjacent aircraft, having been transitioned past the adjacent aircraft's wing via a height adjustment device according to the present disclosure.

Height adjustment devices 24 may be configured to guide first aircraft 26 to transition first aircraft 26 from an entering position to a final position. For example, FIGS. 5-8 illustrate an example transition of first aircraft 26 moving past, or being moved past, second aircraft 34, optionally at an angle to airport gate 10 or airport terminal, rather than pulling in straight such that the aircraft is perpendicular to the airport gate. FIG. 5 shows first aircraft 26 in an entering position outside of airport gate 10, while FIG. 7 shows first aircraft 26 in a final position in airport gate 10. FIG. 6 shows an intermediate position during the transition between the entering position and the final position in which first aircraft 26 is parked at gate 10. With reference to FIG. 5, first aircraft 26 may taxi to position it on an approach line 40. In some examples, electric motors and sensors may be configured to determine the precise positioning of first aircraft 26 relative to approach line 40, height adjustment device 24, second aircraft 34, and/or gate 10. In the entering position, first aircraft 26 is not yet engaged with height adjustment device 24, and thus is not tilted, lowered, and/or lifted with respect to second aircraft 34. As first aircraft 26 continues along approach line 40, it may be tilted, lowered, and/or lifted by height adjustment device 24 to avoid interference between wing 20*a* of first aircraft 26 and wing 20*c* of second aircraft 34. As shown in FIG. 6, as first aircraft 26 passes second aircraft 34, wing 20*a* and wing 20*c* overlap, but do not collide because height adjustment device 24 creates a vertical offset between wings 20*a*, 20*c*.

In some examples, height adjustment device 24 may be configured to tilt, lower, and/or lift one or both aircraft to varying degrees throughout the transition between the entering position and the final position. For example, first aircraft 26 may be tilted by a first amount (e.g., 4 degrees) in preparation for clearing wing 20*c* of second aircraft 34 adjacent to first aircraft 26, and then further tilted by a second amount (e.g., 8 degrees) as wing 20*a* passes over wing 20*c*. Generally, first aircraft 26 (and/or second aircraft 34) is tilted, lowered, and/or lifted a sufficient amount such that an inboard section of first aircraft 26 clears the wing tip of second aircraft 34 by a predetermined threshold vertical offset. In other words, height adjustment device 24 may be configured to create a predetermined threshold vertical clearance between a first wing (e.g., wing 20*a*) of one aircraft (e.g., first aircraft 26) and an adjacent wing (e.g., wing 20*c*) of an adjacent aircraft (e.g., second aircraft 34). The predetermined threshold vertical clearance may be at least 1 inch, at least 3 inches, at least 5 inches, at least 7 inches, at least 10 inches, and/or at least 12 inches. Additionally or alternatively, the predetermined threshold vertical clearance may be selected based at least in part on a tolerance of wing flex of the wing of the aircraft (e.g., wing 20*a* of first aircraft 26) and of the adjacent wing of the adjacent aircraft (e.g., wing 20*c* of second aircraft 34). In some examples, the predetermined threshold vertical clearance is selected to be sufficient to withstand stacked tolerances, such as tolerances for wing flexing under a stiff wind, general wing flex, wind considerations, uneven pavement or ground surfaces at the airport, and etc.

Figure 8:
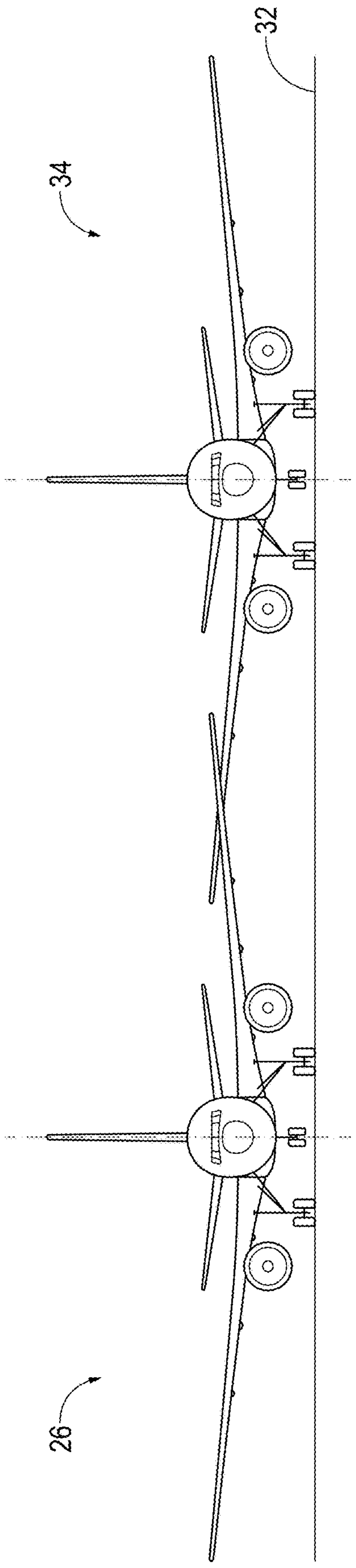
FIG. 8 is a front elevation schematic representation of the first aircraft of FIG. 7 in the final position with respect to the adjacent aircraft.

As first aircraft 26 further transitions towards the final position, the tilt and/or the degree of lowering or lifting may be reduced. For example, the tilt angle of first aircraft 26 may be reduced to 6 degrees, then to 4 degrees, then to 2 degrees, and/or to zero degrees as it transitions to the final position shown in FIG. 7 in which wing 20*a* is now positioned past wing 20*c* and first aircraft 26 is parked in gate 10. Thus, height adjustment device 24 may be configured to tilt first aircraft 26 at a plurality of different tilt angles as first aircraft 26 moves between the entering position and the final position. In some examples, as shown in FIG. 8, height adjustment device 24 is configured to return first aircraft 26 to a level orientation in the final position.

Disclosed height adjustment devices 24 advantageously may be configured to improve aircraft efficiency and economics by enabling more efficient aircraft to enter the market without using wing folds. Certain examples of height adjustment devices 24 may enable the avoidance of throttling the aircraft to position the aircraft on, in, or otherwise into engagement with height adjustment device 24. The use of such height adjustment devices 24 may provide additional advantages, such as avoiding the increased costs and weight associated with the incorporation of wing folds in aircraft. Additionally or alternatively, disclosed height adjustment devices 24 may unblock sales of larger-span aircraft to customers heavily invested in existing limited infrastructure or to gate-constrained airports by circumventing gate constraints that would otherwise limit the use of more efficient large span aircraft.

Figure 9:
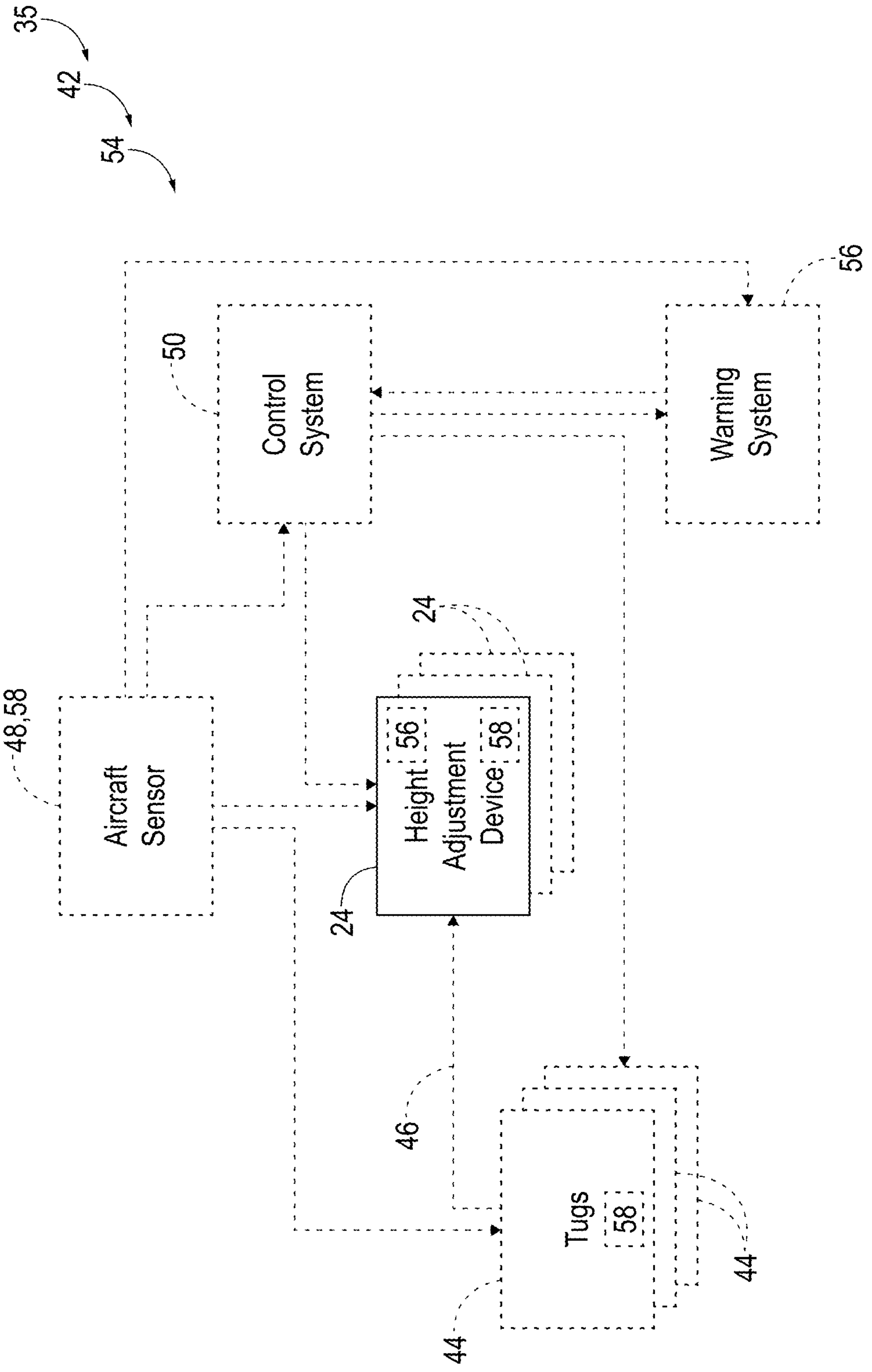
FIG. 9 is a schematic black box representation of systems including height adjustment devices according to the present disclosure.

FIG. 9 is a schematic black box diagram illustrating non-exclusive examples of systems 42 according to the present disclosure that include one or more height adjustment devices 24. In some examples, system 42 includes a plurality of height adjustment devices 24. For example, system 42 may include a plurality of different types and/or sizes of height adjustment devices 24, each of which may be spaced apart in a plurality of different locations (e.g., different airport gates) of an airport. Some systems 42 include a plurality of different types, sizes, and/or configurations of height adjustment devices 24, such as including different height adjustment devices 24 at different locations of the airport for each different type of aircraft utilizing the airport, and/or various lifts or jacks configured to be utilized in combination with built-in aspects of height adjustment device 24. Aspects of system 42 and/or height adjustment device 24 may be autonomous, and may be configured to park or position a first aircraft in a first gate or area while the first aircraft is engaged with height adjustment device 24 and a second aircraft is moved past the first aircraft, and/or systems 42 may be configured to engage the first aircraft with height adjustment device 24 while the first aircraft is moved past the second aircraft, which may be parked. Once each aircraft has cleared any adjacent aircraft or other obstacles, height adjustment device 24 may level out the aircraft such that it is not tilted, and/or position the aircraft at a baseline height level of the apron or other ground surface.

Additionally or alternatively, a plurality of height adjustment devices 24 may be used to lift, lower, and/or tilt a plurality of adjacent aircraft. For example, a first height adjustment device 24 may be configured to lift, lower, and/or tilt a first aircraft, and a second height adjustment device 24 may be configured to lift, lower, and/or tilt a second aircraft. To this end, two or more height adjustment devices 24 of system 42 may be configured to be coordinated with one another, or complement one another, such as by tilting two adjacent aircraft away from each other to increase the vertical clearance compared to just tilting one of the aircraft, and/or two height adjustment devices 24 may be coordinated to engage with a single aircraft at the same time. In some examples, adjacent aircraft may be lifted or lowered to a greater or lesser extent than one another, and/or adjacent aircraft may be tilted to a greater or lesser extent than one another. In one specific example, a first aircraft may be tilted by at least about 6 degrees, while a second aircraft may be tilted by about 2 degrees, while one of the aircraft is moved past the other, such as in instances where the second aircraft is parked at a second airport gate, and the first aircraft is entering a first airport gate adjacent the second airport gate. In other words, some systems 42 or height adjustment devices 24 are configured to tilt, lower, and/or lift just the moving aircraft or just the parked aircraft while the moving aircraft is moved past the adjacent parked aircraft, while some systems 42 or height adjustment devices 24 are configured to tilt, lower, and/or lift both the moving aircraft and the adjacent parked aircraft simultaneously.

Some systems 42 include a tug, or pushback tractor, 44 configured to position an aircraft on or in height adjustment device 24 (or otherwise engage the aircraft with height adjustment device 24), and/or to push back the aircraft off of or out of height adjustment device 24 when the aircraft is leaving the gate. Additionally or alternatively, tugs 44 may be configured to position one or more mobile jacks or lifts within an airport or airport gate location to be used in conjunction with built-in aspects of height adjustment device 24 for an incoming aircraft, to move the jack or lift out of the way when an aircraft with a smaller wingspan is using the gate, to switch out one size or type of jack or lift for a different size or type of jack or lift, and/or to move the jack or lift to a different airport gate to help transition an aircraft in a different location from its entering position to its final position. Additionally or alternatively, in some examples, a communication link 46 between height adjustment device 24 and one or more tugs 44 may be configured to enable tug 44 to move an aircraft relative to height adjustment device 24, such as to pull the aircraft onto and/or into engagement with height adjustment device 24, and/or to push the aircraft off of or out of engagement with height adjustment device 24.

Some systems 42 include a control system 50 configured to coordinate positioning of aircraft, tugs 44, and/or jacks and lifts with respect to built-in aspects of height adjustment devices 24. For example, control system 50 may be configured to track which types of aircraft are located at which gates throughout the airport, which type or size of height adjustment device 24 is needed to enable a given aircraft to be parked in a given airport gate (taking into consideration the wingspan of the aircraft, the gate size, and the wingspan of adjacent aircraft parked at adjacent airport gates), and therefore determine the desired gate having the desired height adjustment device 24 for a given aircraft configuration. Additionally or alternatively, control system 50 may be configured to adjust a height, tilt angle, or other setting of height adjustment device 24, in response to the needs of an incoming aircraft relative to the constraints of the airport environment and adjacent aircraft. In this manner, control system 50 may be configured to prevent collisions between the aircraft, an/the adjacent aircraft, and/or one or more components of system 42 or height adjustment device 24 itself. In some examples, control system 50 may be configured such that system 42 and/or height adjustment device 24 is autonomous and/or automated. Control system 50 may be configured to communicate with (e.g., send and/or receive information to/from) and/or control height adjustment devices 24, tugs 44, and/or one or more sensors 58 of system 42.

Figure 10:
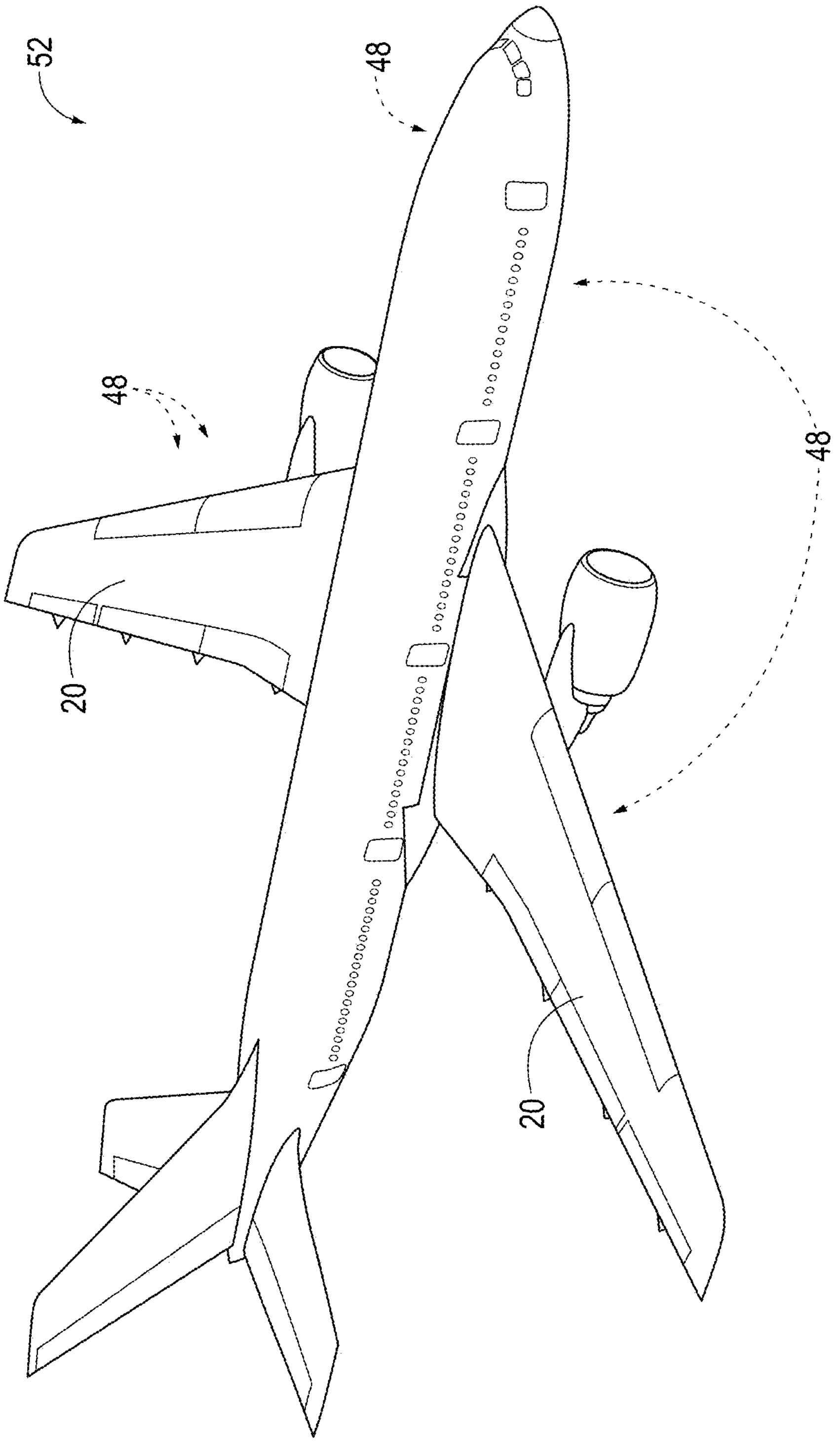
FIG. 10 is a schematic representation of an aircraft that includes one or more aircraft sensors of presently disclosed systems.

For example, system 42 may include one or more sensors 58 integrated into, coupled to, and/or in wireless communication with height adjustment devices 24 and/or tugs 44. Sensors 58 may include a variety of sensors as will be understood by those skilled in the art, and specifically may include one or more ultrasonic sensors in some examples. At least one aircraft sensor 48 (which is an example of sensor 58) may be positioned on or within the aircraft engaging with height adjustment device 24. Aircraft sensor 48 may be configured to measure and/or provide information regarding the height, orientation, and/or position of one or more points on the aircraft, and/or to measure or provide information regarding a distance between one or more points on the aircraft and an adjacent aircraft or other object within proximity to the aircraft or height adjustment device 24, in order to facilitate positioning of the aircraft with respect to an engagement surface of height adjustment device 24. Aircraft sensors 48 may include radio frequency communication capabilities such that they may be configured to send and/or receive information with control system 50. FIG. 10 schematically illustrates an aircraft 52 that includes one or more components of system 42, such as one or more aircraft sensors 48 configured to interact with height adjustment device 24.

Additionally or alternatively, sensors 58 may include a ground sensor positioned in or on a ground surface on which the aircraft is supported (e.g., ground surface 32, apron 33, etc.), to facilitate positioning of the aircraft with respect to an engagement surface of height adjustment device 24, a floor sensor positioned in or on a floor surface on which the aircraft is supported, to facilitate positioning of the aircraft with respect to the engagement surface of height adjustment device 24, and/or a fail safe stop sensor configured to stop movement of the aircraft via height adjustment device 24 if an impending collision is detected.

Systems 42 also may include a warning system 56. Components of, or warning system 56 itself, may be integrated into height adjustment devices 24, and/or may be separate components configured to wirelessly communicate with tugs 44, height adjustment devices 24, aircraft sensors 48, and/or control system 50. Warning system 56 is generally configured to detect potential collisions between the aircraft and a second aircraft or other object, and may be further configured to warn flight crew, alert ground crew, engage an auto-brake, and/or actuate tilting of the aircraft in response to any detected potential collisions. Various examples of warning systems 56 may include lights, flashing lights, sounds, wireless communication, and/or navigation systems.

With reference again to FIG. 9, a kit 54 may include a plurality of height adjustment devices 24. For example, a first height adjustment device 24 of kit 54 may be configured to engage a first type of aircraft, while a second height adjustment device 24 of kit 54 may be configured to engage a second (e.g., different) type of aircraft. Kit 54 therefore may include different types and/or sizes of height adjustment devices to accommodate different types of aircraft, and/or different arrangements or gate sizes at a given airport, such that different height adjustment devices 24 may be used from kit 54 as needed in different situations occurring at the airport (e.g., different combinations of adjacent types of aircraft to be parked next to each other may be directed to different gates having different integrated height adjustment devices 24). As another example, one or more height adjustment devices 24 of kit 54 may be configured for use in a first arrangement of adjacent aircraft types, and at least one or more other height adjustment devices 24 of kit 54 may be configured for use in a second arrangement of adjacent aircraft types, wherein the second arrangement is different from the first arrangement. Generally, systems 42, kits 54, and/or height adjustment devices 24 may be used to create vertical clearance between wings of adjacent aircraft, and/or to enable a pair of aircraft to be parked in adjacent airport gates when each respective airport gate of the adjacent airport gates is narrower that a respective wingspan of each respective aircraft of the pair of aircraft, without needing to utilize aircraft with wing folds.

Airports 35 incorporating systems 42, height adjustment devices 24, and/or kits 54 also are within the scope of the present disclosure. For example, airport 35 may include one or more trenches, troughs, recesses 68 and/or ramps 25 built into apron 33. Some airports 35 may include a height adjustment device 24 in the form of a trench, trough, or recess 68 built in a first gate parking area, and a level ground surface, a ramp, a jack, and/or a lift in a second gate parking area adjacent the first gate parking area. Some airports 35 include specialized infrastructure for a plurality of different type of aircraft, such that height adjustment device 24 is configured to create substantially similar sill heights across different types of aircraft. Additionally or alternatively, airports 35 may include one or more markings on apron 33 configured to guide the aircraft into, onto, or otherwise in engagement with height adjustment device 24 (e.g., markings 37 shown in FIG. 5).

Figure 11:
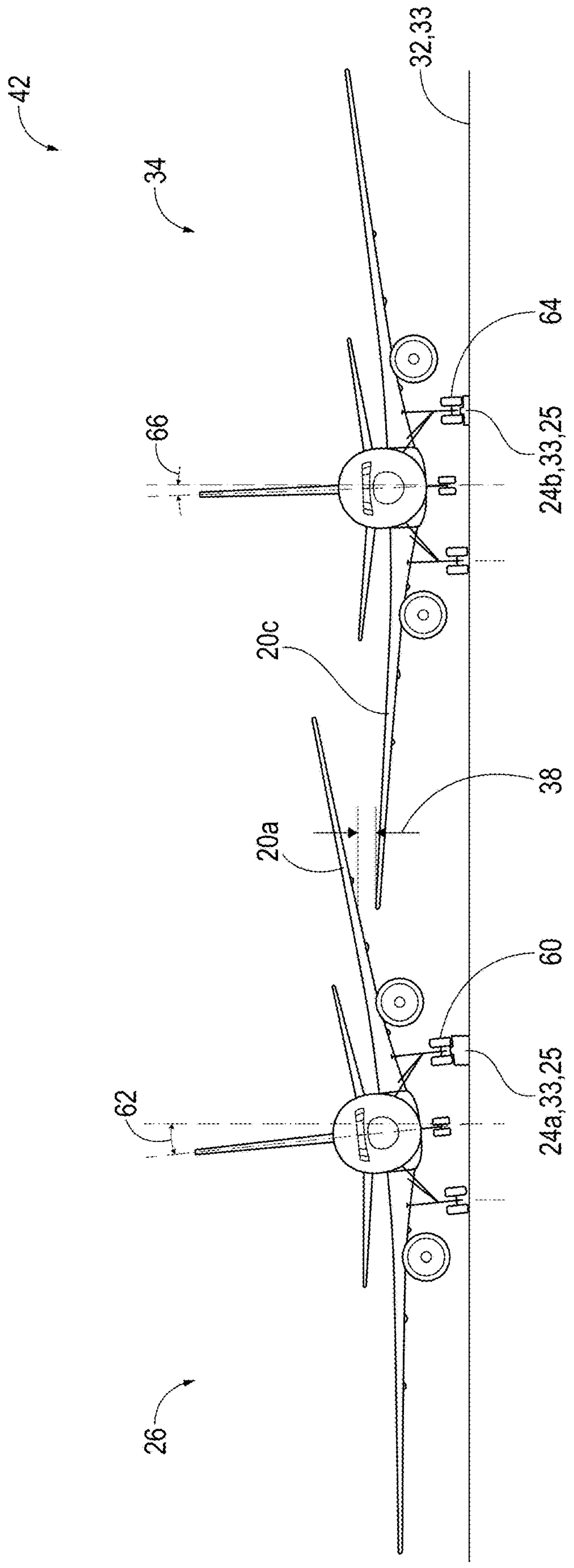
FIG. 11 is a front elevation schematic representation of a first aircraft engaged with and tilted by a first height adjustment device, according to the present disclosure, adjacent to a second aircraft engaged with and tilted by a second height adjustment device, according to the present disclosure.

FIG. 11 schematically illustrates an example of system 42 having a plurality of height adjustment devices 24 built into apron 33, in which a first height adjustment device 24*a* of the plurality of height adjustment devices 24 tilts a first aircraft 26, while a second height adjustment device 24*b* tilts a second aircraft 34. In the example of FIG. 9, first height adjustment device 24*a* is engaged with a first landing gear 60 on the left side of first aircraft 26 to tilt first aircraft 26 by a first tilt angle 62, thereby increasing the distance between wing 20*a* and a baseline level of a ground surface 32. As used herein, the baseline level of ground surface 32 and apron 33 refers to the level of the surface/apron in areas of the surface/apron that do not include incorporated height adjustment devices 24. At the same time, second height adjustment device 24*b* is engaged with a second landing gear 64 on the left side of second aircraft 34 to tilt second aircraft 34 by a second tilt angle 66, such that wing 20*c* of second aircraft 34 is moved away from wing 20*a* of first aircraft 26 and towards the baseline level of ground surface 32 (e.g., the baseline level of apron 33). In other words, height adjustment devices 24*a*, 24*b* may be arranged with respect to adjacent aircraft 26, 34 such that adjacent wings 20*a*, 20*c* are tilted in opposite directions (e.g., wing 20*a* being tilted up away from the baseline level of ground surface 32, and wing 20*c* being tilted down towards the baseline level ground surface 32), thereby increasing the vertical clearance 38 between wings 20*a*, 20*c*. Height adjustment devices 24 may be configured to tilt the respect adjacent aircraft 26, 34 to differing degrees. For example, first aircraft 26 may be tilted to a greater extent than second aircraft 34 (e.g., first tilt angle 62 may be greater than second tilt angle 66). In a specific, non-limiting example, first tilt angle 62 may be around 6 degrees, and second tilt angle 66 may be around 2 degrees.

Figure 12:
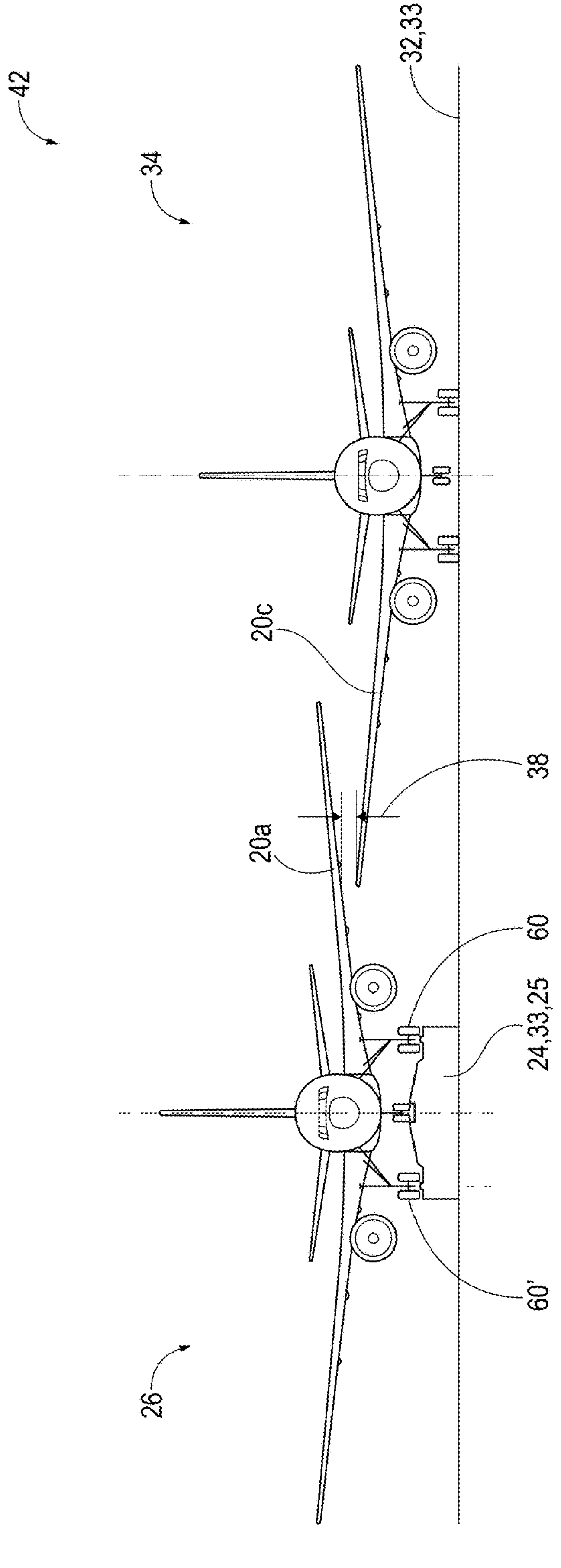
FIG. 12 is a front elevation schematic representation of a first aircraft engaged with and lifted by a height adjustment device, according to the present disclosure, adjacent to a second aircraft positioned on the baseline level of the ground surface.

FIG. 12 schematically illustrates an example of system 42 having an example of height adjustment device 24 that is configured to lift, raise, or elevate a first aircraft 26 above the baseline level of ground surface 32 without tilting first aircraft 26. For example, height adjustment device 24 may include a ramp built into apron 33 to position first aircraft 26 above the baseline level of ground surface 32. In this example, a first landing gear 60 on the left side of first aircraft 26 and a first landing gear 60' on the right side of first aircraft 26 are both engaged with (e.g., positioned on) height adjustment device 24. In this manner, the tilt angle is kept to zero while still creating a vertical offset 38 between wing 20*a* of first aircraft 26 and wing 20*c* of an adjacent aircraft 34, such that first aircraft 26 may park next to and/or drive by adjacent aircraft 34 and/or such that adjacent aircraft 34 may park next to and/or drive by first aircraft 26. In other words, height adjustment device 24 may be utilized with the parked or stationary aircraft while a second aircraft is moved past it, or height adjustment device 24 may be utilized with a moving aircraft as it is moved past a parked or stationary aircraft (e.g., the moving aircraft may drive up onto height adjustment device 24, or be pulled up onto height adjustment device 24, as it moves past the adjacent aircraft).

Figure 13:
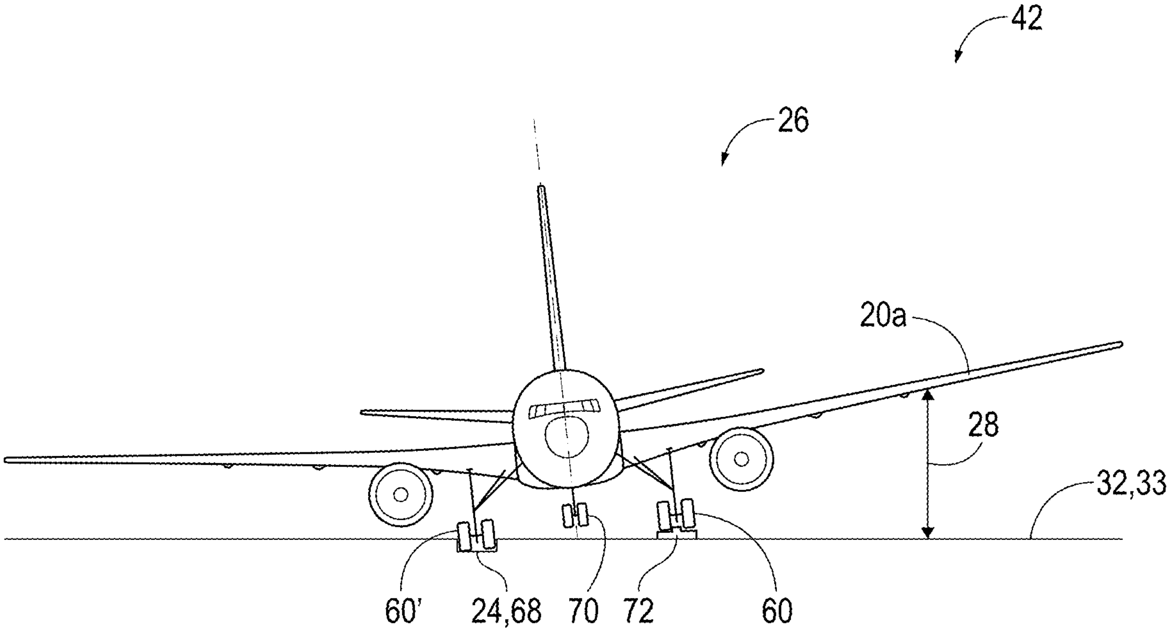
FIG. 13 is a front elevation schematic representation of a first side of an aircraft engaged with and lowered by a height adjustment device, according to the present disclosure, while a second side of the aircraft is tilted by a freestanding ramp.

Disclosed height adjustment devices 24 may be used in combination with each other within given systems 42 (such as in the example of FIG. 11), and/or may be combined in systems 42 with one or more height adjustment devices that are freestanding, mobile, and/or not built into apron 33. FIG. 13 schematically illustrates an example of system 42 that combines height adjustment devices 24 integrated into airport infrastructure (e.g., apron 33) according to the present disclosure with a freestanding height adjustment device temporarily positioned on ground surface 32, which is in the form of a mobile ramp 72 in this example. In the example shown in FIG. 13, a landing gear 60 on the left side of an aircraft 26 is engaged with (e.g., positioned on) mobile ramp 72, which tilts the left side of aircraft 26 away from ground surface 32, while a landing gear 60' on the right side of aircraft 26 is positioned within height adjustment device 24 in the form of a trench 68, which further tilts aircraft 26 such that the left side is moved away from the baseline level of ground surface 32 and the right side of aircraft 26 is moved towards the baseline level of ground surface 32. Thus, one side of aircraft 26 may be tilted upwards (e.g., the left side engaged with mobile ramp 72), while the other side of aircraft 26 may be lowered (e.g., the right side engaged with trench 68). A representative non-limiting example may involve tilting the left side of aircraft 26 by about 3 degrees via mobile ramp 72 while lowering the right side of aircraft 26 by about 12 inches via the maximum depth of trench 68, to create an overall increase of about 12 inches in vertical offset 28 between wing 20*a* and the baseline level of ground surface 32. Such an arrangement may be configured to keep a nosewheel 70 of aircraft 26 at a normal (e.g., level) elevation/position on ground surface 32. Of course, the aircraft may be tilted by a greater or lesser tilt angle, and/or the depth of trench 68 may be increased or decreased to create a greater or lesser overall vertical distance 28. In some examples, the height of mobile ramp 72 may be coordinated with the depth of trench 68 such that no work is needed to engage the aircraft with height adjustment device 24 and mobile ramp 72. Co-pending U.S. patent application titled HEIGHT ADJUSTMENT DEVICES, SYSTEMS INCLUDING THE SAME, AND METHODS FOR CREATING VERTICAL CLEARANCE BETWEEN WINGS OF ADJACENT AIRCRAFT, filed on Feb. 13, 2025, the entirety of which is incorporated by reference herein for all purposes, discloses freestanding height adjustment devices that may be used in conjunction with built-in height adjustment devices 24 disclosed herein. That said, in some examples, mobile ramp 72 may instead be a built-in ramp 25 that is used in conjunction with trench 68 in a given system 42 of height adjustment devices 24.

Turning now to FIGS. 14-20, illustrative non-exclusive examples of height adjustment devices 24 are illustrated. Where appropriate, the reference numerals from the schematic illustrations of FIGS. 2-13 are used to designate corresponding parts in FIGS. 14-20; however, the examples of FIGS. 14-20 are non-exclusive and do not limit height adjustment devices 24 to the illustrated embodiments of FIGS. 14-20. That is, height adjustment devices 24 are not limited to the specific embodiments illustrated in FIGS. 14-20, and height adjustment devices 24 may incorporate any number of the various aspects, configurations, characteristics, properties, etc. that are illustrated in and discussed with reference to the schematic representations of FIGS. 2-13 and/or the embodiments of FIGS. 14-20, as well as variations thereof, without requiring the inclusion of all such aspects, configurations, characteristics, properties, etc. For the purpose of brevity, each previously discussed component, part, portion, aspect, region, etc, or variants thereof may not be discussed, illustrated, and/or labeled again in FIGS. 14-20; however, it is within the scope of the present disclosure that the previously discussed features, variants, etc. may be utilized therewith.

Figure 14:
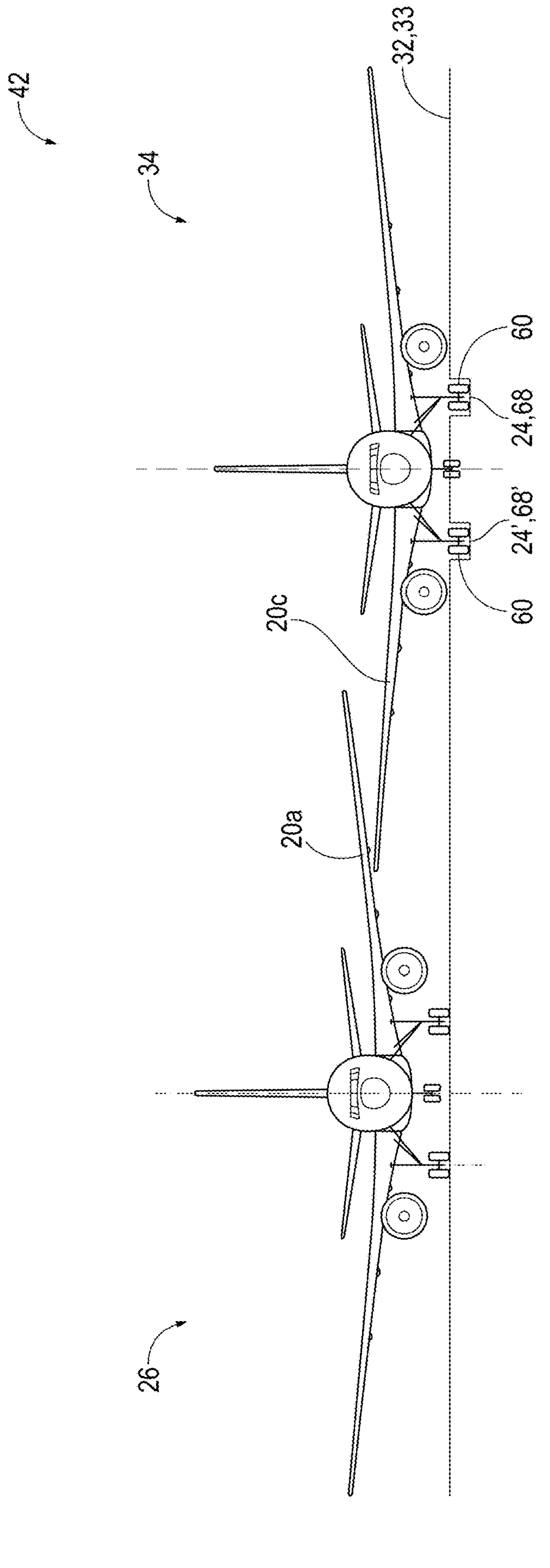
FIG. 14 is a front elevation view of an example of a height adjustment device according to the present disclosure.

As noted, presently disclosed height adjustment devices 24 integrated into airport infrastructure may include one or more trenches, troughs, or recesses 68 formed in apron 33 of the airport. FIG. 14 illustrates an example of systems 42 of height adjustment device 24 in the form of a first trench 68 configured to receive a main landing gear 60 on a left side of an aircraft 34, as well as a second trench 68' configured to receive a main landing gear 60' on a right side of aircraft 34. Trenches 68, 68' may be at least substantially the same depth and/or size, as shown in FIG. 14, though in some examples, one trench may be a different size and/or depth than the other trench, such as to create a tilt in aircraft 34 in addition to lowering aircraft 34 with respect to the baseline level of apron 33. Additionally or alternatively, the bottom elevation of trenches 68 may be selectively adjustable to enable different elevations for different types or models of aircraft.

Figure 15:
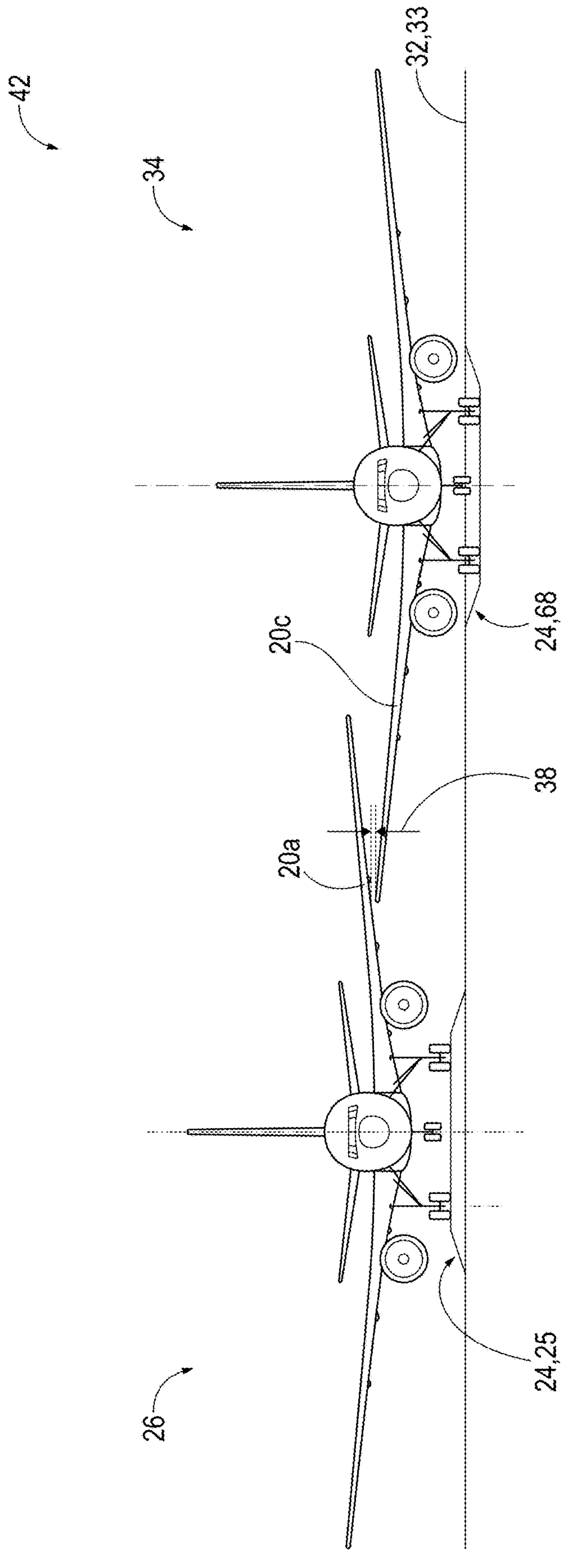
FIG. 15 is a front elevation view of an example of a height adjustment device according to the present disclosure.

FIG. 15 illustrates another example of systems 42 of height adjustment devices 24, in which the benefits of height adjustment devices 24 in the form of ramps 25 can be combined with height adjustment devices 24 in the form of trenches 68. In the example shown in FIG. 15, a first aircraft 26 is elevated above the baseline level of ground surface 32, while a second aircraft 34 is lowered below the baseline level of ground surface 32. By combining ramps 25 and trenches 68 in adjacent airport gates (e.g., used on adjacent aircraft that must clear one another to get in and out of the airport gate), the same vertical offset 38 may be created between adjacent wings 20*a* and 20*c* with smaller elements. In other words, for systems 42 using just ramp 25 without trench 68, the ramp would need to be taller in order to create the same vertical offset 38, whereas, by combining the two types of height adjustment devices 24 in some systems, the height of ramp 25 can be smaller than otherwise would be needed to achieve a desired vertical clearance between the adjacent wings 20*a*, 20*c* because the depth of trench 68 also is contributing towards the total vertical offset. Similarly, for systems 42 using just trench 68 without ramp 25, the trench would need to be deeper in order to create the same vertical offset 38, whereas, by combining the two types of height adjustment devices 24 in some systems, the depth of trench 68 can be shallower than otherwise would be needed to achieve a desired vertical clearance between the adjacent wings 20*a*, 20*c* because the height of ramp 25 also is contributing towards the total vertical offset.

Figure 16:
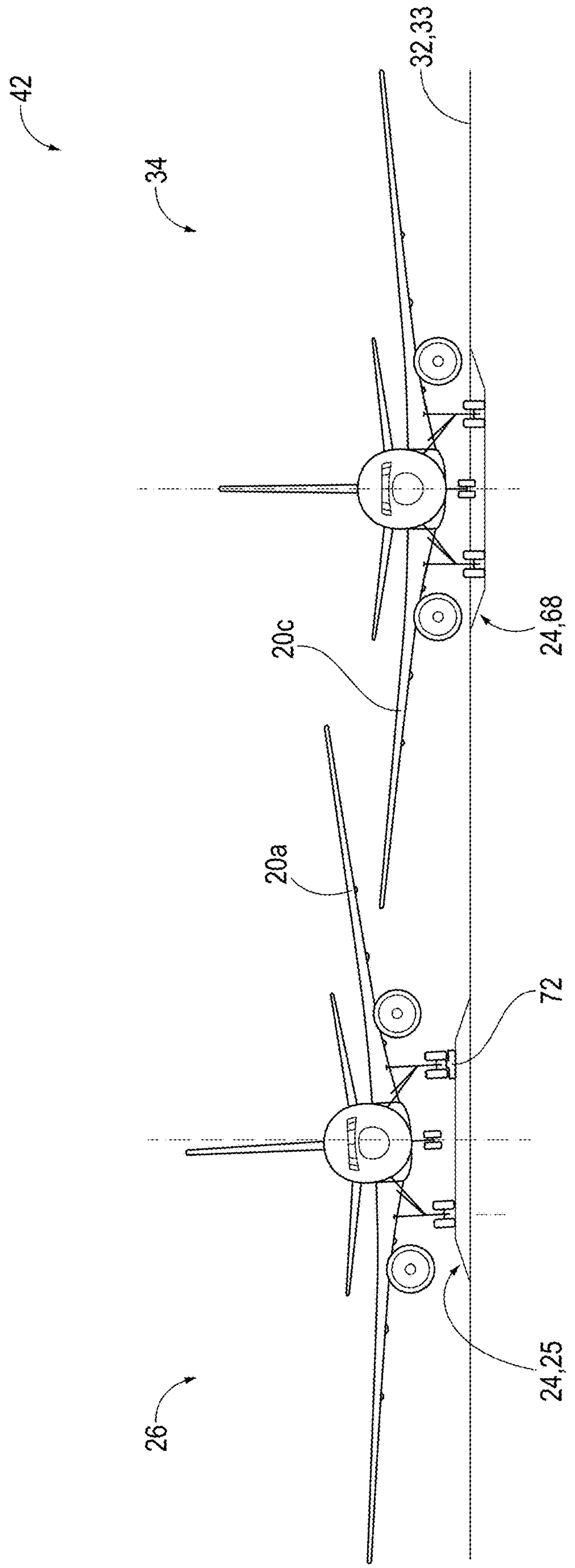
FIG. 16 is a front elevation view of an example of a height adjustment device according to the present disclosure.

FIG. 16 illustrates another example of system 42 that includes a plurality of height adjustment devices in the form of a built-in ramp 25, a trench 68, and a mobile ramp 72. In the example shown in FIG. 16, mobile ramp 72 is positioned on top of one side of built-in ramp 25. Mobile ramp 72 tilts first aircraft 26 while built-in ramp 25 elevates/lifts first aircraft 26, and trench 68 lowers second aircraft 34, thereby creating vertical clearance. Thus, vertical clearance between adjacent wings 20*a*, 20*c* can be achieved by both tilting first aircraft 26 and the elevation changes created both by lifting first aircraft 26 via built-in ramp 25 and lowering second aircraft 34 via built-in trench 68. In an illustrative, non-limiting example, mobile ramp 72 may be configured to tilt first aircraft 26 by about 3 degrees, while built-in ramp 25 may be configured to create an elevation change of about 12 inches (e.g., first aircraft 26 may be lifted about 12 inches above the baseline level of ground surface 32), and trench 68 may be configured to create an elevation change of about 23 inches in the opposite direction (e.g., second aircraft 34 may be lowered by about 12 inches below the baseline level of ground surface 32). Airports incorporating systems 42 may include alternating built-in ramps 25 and trenches 68, and/or one or more gates that include both a built-in ramp 25 and a trench 68 for one airplane (e.g., a built-in ramp positioned to engage the left side main landing gear and a trench positioned to engage the right side main landing gear, or vice versa).

Figure 17:
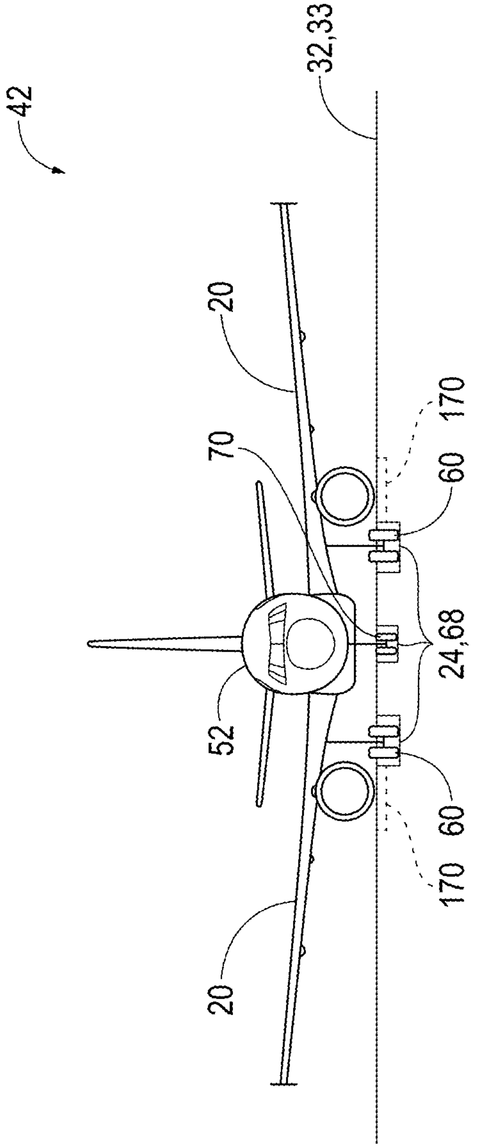
FIG. 17 is a front elevation view of an example of a height adjustment device according to the present disclosure.

FIGS. 17-18 illustrate an example of system 42 including a plurality of trenches 68 configured to receive each main landing gear 60 and nosewheel 70 of aircraft 52, respectively. As best seen in FIG. 18, trenches 68 may have a tapered entrance 126, such that a depth 128 of trench 68 gradually increases as aircraft 52 moves forward into trench 68. In some examples, trench 68 may have a stepped front edge 130 that extends at least substantially perpendicularly to ground surface 32, which may be configured to serve as a stop to prevent further forward motion of aircraft 52 past stepped front edge 130. As indicated by dashed lines 170 in FIGS. 17-18, trenches 68 may be expanded or sized to accommodate aspects or components of various different aircraft, such as the engine nacelles. The exact shape and depth of trenches 68 and any additional cutouts or expansions 170 can be designed for particular configurations or constraints, as understood by those of ordinary skill in the art.

FIG. 18 also indicates an effective sill height 132 of aircraft 52 as engaged with height adjustment device 24. Sill height 132 is important in some baggage/ground operations, which may be tuned to a specific sill height 132 of a particular aircraft model, which thus may lead to resistance against utilizing different aircraft models that may be more efficient or have more advantageous wing heights, but that may have differing sill heights. In some aircraft models, increasing engine fan diameter is limited by wing heights, which in turn limits efficiency of the aircraft. Additionally or alternatively, some aircraft models may increase the length of its landing gear to try to accommodate increases in the engine fan diameter, though longer landing gear may result in unwanted increases in sill height. In scenarios such as these, height adjustment devices 24 (e.g., trenches 68) according to the present disclosure may be used to effectively even out sill heights 132 of different aircraft having different lengths of landing gear and/or different wing heights, by lowering the aircraft such that its effective sill height 132 is the same as or similar to the sill heights of other aircraft models for which ground operations are configured. Thus, new, more efficient aircraft may be designed without being limited by their sill heights, in view of presently disclosed height adjustment devices 24 that may be used therewith.

Figure 19:
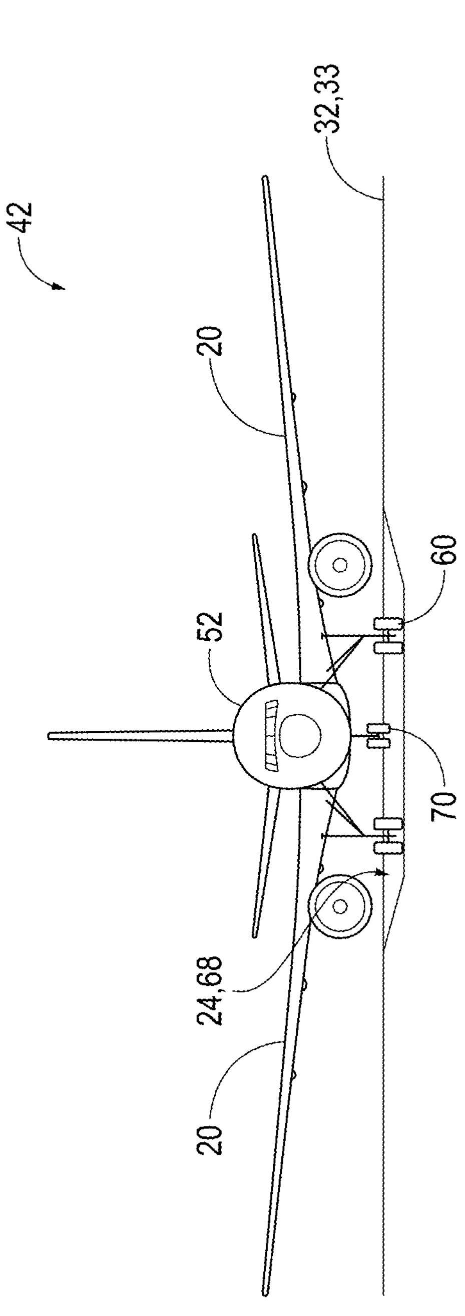
FIG. 19 is a front elevation view of an example of a height adjustment device according to the present disclosure.

FIGS. 19-20 illustrate another example of system 42 that includes a plurality of trenches 68 formed in apron 33 of an airport. As represented in FIGS. 19-20, disclosed height adjustment devices 24 may be used to adjust a height of an aircraft in situations where there is not necessarily a wing clearance issue. For example, trenches 68 may be used to reduce a sill height of aircraft 52 in situations where it is desired to utilize ground operation equipment that would otherwise be configured for a different sill height. In other examples, height adjustment devices 24 may be used to increase a sill height of an aircraft for the sake of increasing the sill height, even if there is not a wing clearance issue with any adjacent aircraft.

Figure 21:
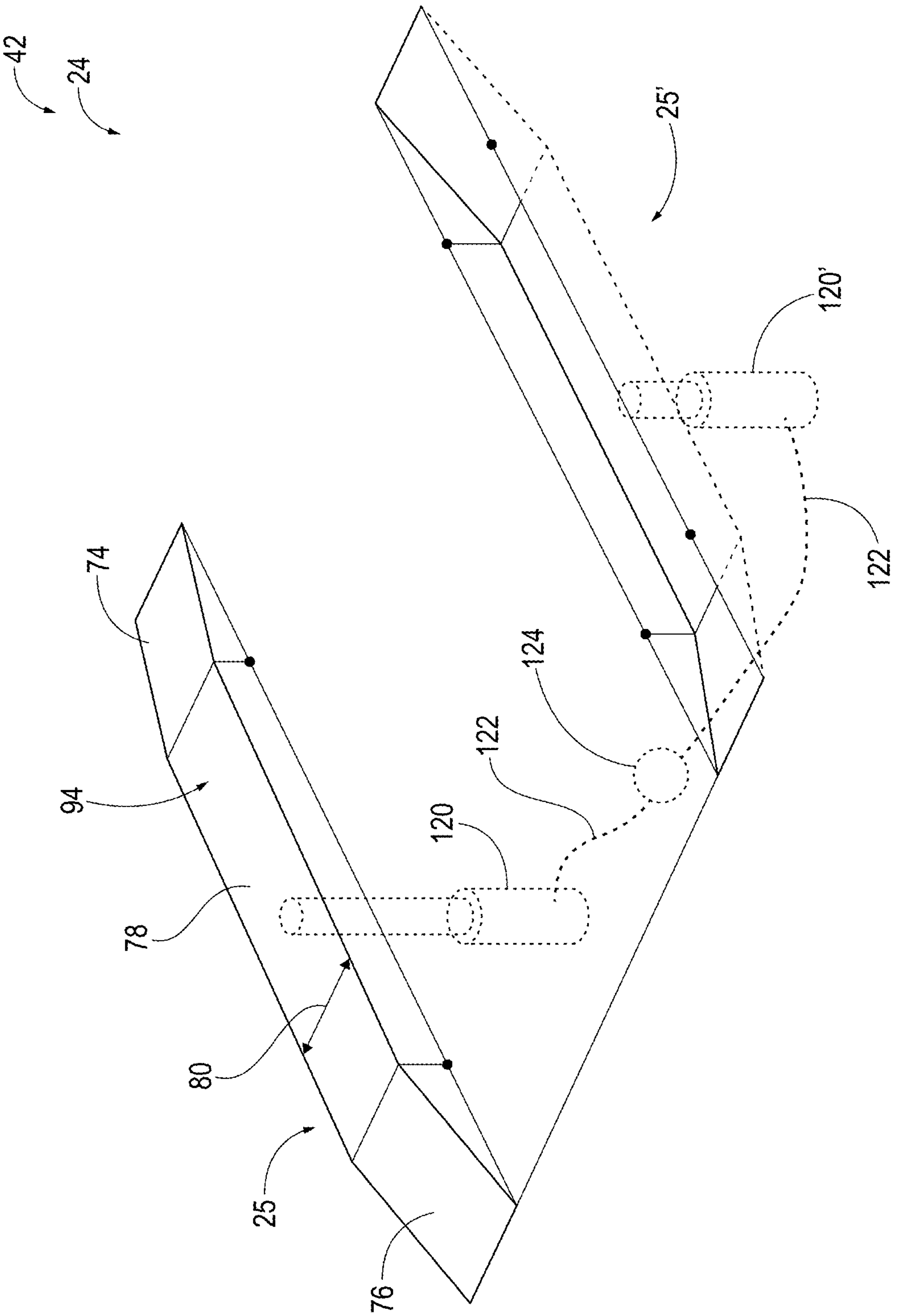
FIG. 21 is a perspective schematic representation of an example of an interconnected height adjustment device according to the present disclosure.

FIG. 21 schematically illustrates an example of system 42 in which height adjustment device 24 includes at least one actuating piston 120 configured to act on a main gear strut of an aircraft, with actuating piston 120 being configured to selectively and reversibly change a height of the main gear strut by raising and lowering at least a portion of height adjustment device 24 (e.g., by raising and lowering mobile ramp 72, or raising a lowering a built-in ramp 25). In some examples, a first actuating piston 120 is configured to act on a first main gear strut of the aircraft, while a second actuating piston 120' is configured to act on a second main gear strut of the aircraft. An interconnect 122 between first actuating piston 120 and second actuating piston 120' may be configured to leverage first actuating piston 120 and second actuating piston 120' to minimize power and energy required to adjust the height of the aircraft via height adjustment device 24. In some examples, an actuator or pump 124 may be used to actuate actuating pistons 120 and/or 120'. In some examples, actuator 124 is an in-ground pump or actuator configured to selectively raise and lower aircraft landing gear.

Additionally or alternatively, height adjustment device 24 may be configured such that a load pushing down on one side of height adjustment device 24 causes the other side to be pushed upwards. In some such examples, no power is needed to tilt the aircraft because gravity on one side may at least partially provide the power needed to raise or tilt the aircraft on the other side (e.g., actuator 124 may be at least partially gravity powered). For example, an in-ground pump or actuator 124 may be configured to raise a first landing gear support structure (e.g., ramp 25) to raise one side of the aircraft, while simultaneously lowering a second landing gear support structure (e.g., ramp 25') to lower an opposite side of the aircraft. Thus, in-ground pump or actuator 124 may control a first landing gear support structure and a second landing gear support structure within system 42. Interconnect 122 may be mechanical, hydraulic, and/or pneumatic in various examples of height adjustment device 24 and/or system 42, and may be configured to interconnect the first landing gear support structure and the second landing gear support structure.

Ramps 25 or other height adjustment devices 24 disclosed herein may include a first angled portion 74, a second angled portion 76, and a level portion 78 positioned between first angled portion 74 and second angled portion 76. A width 80 of ramp 25 may be sufficient to receive a truck of the main landing gear on one side of the aircraft. In some examples, ramp 25 is configured to receive at least a portion of the aircraft and then actively lift the aircraft up off of the ground surface or the floor surface supporting the aircraft in its entry position (e.g., before engagement with the height adjustment device).

Figure 22A:
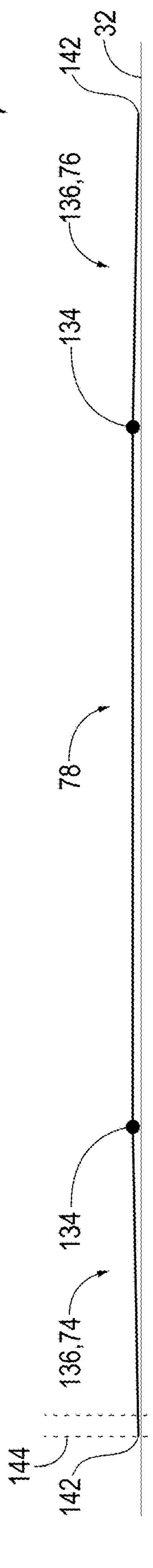
FIGS. 22A-B are side elevation schematic representations of examples of hinged height adjustment devices shown in a level position (FIG. 22A) and a raised position (FIG. 22B).
Figure 22B:
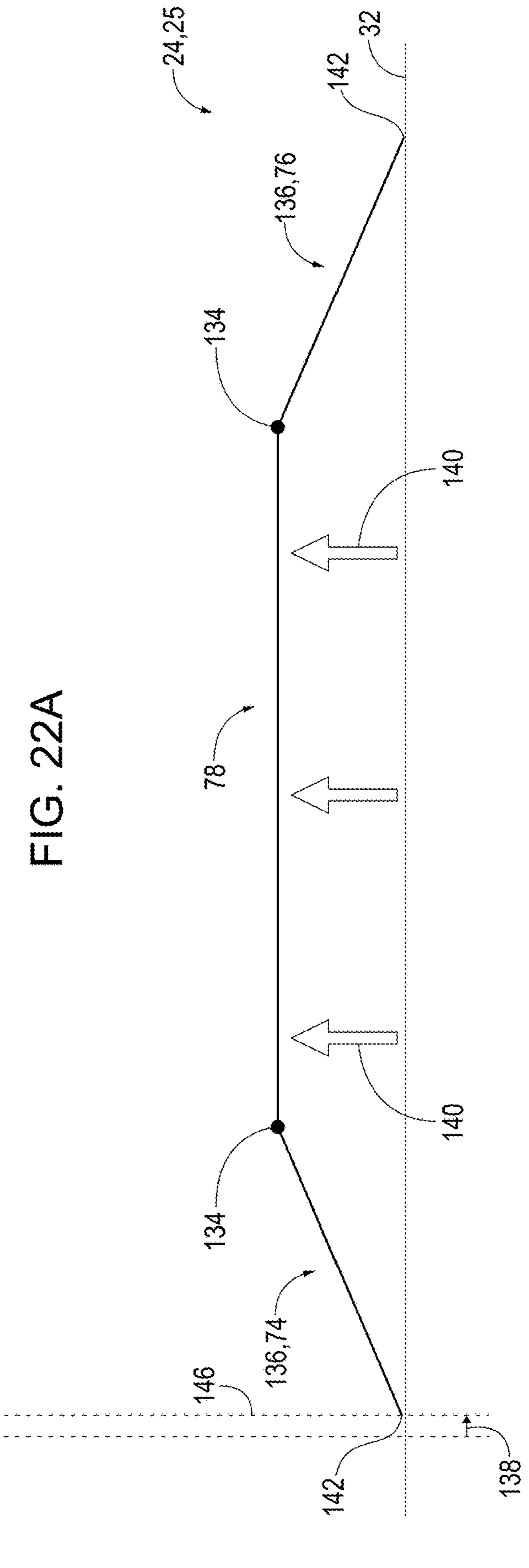

FIGS. 22-24 illustrate examples of height adjustment devices 24 having hinges 134 and sliding panels 136. FIG. 22A shows an example of height adjustment device 24 in a configuration in which portions 74, 76, 78 are flattened to be substantially parallel to and level with ground surface 32. Height adjustment device 24 may be placed in this position when not in use. As shown in FIG. 22B, portions 74, 76, 78 may be raised away from ground surface 32 (e.g., moved in the direction as indicated by arrows 140) in order to position height adjustment device 24 in a configuration for use in which an aircraft would be vertically translated away from ground surface 32 when it is engaged with height adjustment device 24. Hinges 134 allow sliding panels 136 to be angled with respect to ground surface 32 and level portion 78, thereby creating angled portions 74, 76 of ramp 25, while level portion 78 may be lifted above ground surface 32 but remain at least substantially parallel to ground surface 32. In transitioning to the position shown in FIG. 22B, outer edges 142 of sliding panels 136 may move, or slide, along ground surface 32. For example, dotted line 144 indicates the position of outer edge 142 on the left side of ramp 25 in the level/lowered configuration shown in FIG. 22A, while dotted line 146 indicates the position of the same outer edge 142 in the raised position shown in FIG. 22B. The distance between dotted lines 144, 146 represents movement of outer edge 142 along ground surface 32 to accommodate raising ramp 25 to the position shown in FIG. 22B. To facilitate such sliding or movement of sliding panels 136 along ground surface 32, outer edges 142 may include roller wheels, a track, and/or other mechanisms to facilitate movement along ground surface 32.

Figures 23A, 23B:
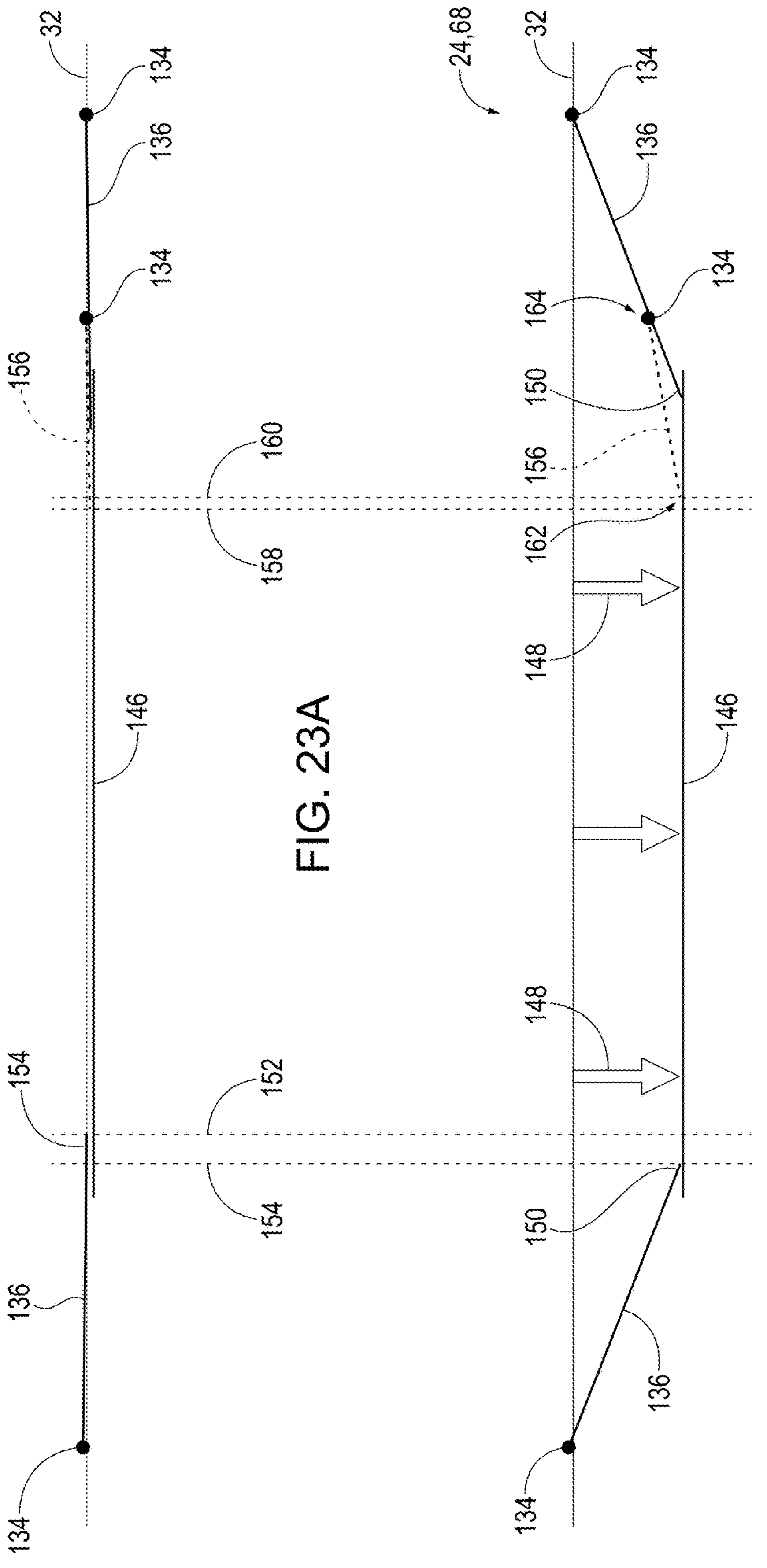
FIGS. 23A-B are side elevation schematic representations of examples of hinged height adjustment devices shown in a level position (FIG. 23A) and a lowered position (FIG. 23B).

FIGS. 23A and 23B illustrate a similar concept as applied to height adjustment devices 24 in the form of trenches 68 that may be leveled, as shown in FIG. 23A, and then transitioned to a lowered configuration as shown in FIG. 23B. In the configuration of FIG. 23A, panels 136, 146 may cover the recess formed in the airport apron to allow for aircraft to drive on the apron without entering trench 68. To transition height adjustment device 24 to the configuration shown in FIG. 23B, a panel 146 may be lowered into a recess formed in the apron in the direction indicated by arrows 148, with said movement being accommodated by hinges 134 and sliding panels 136 sliding with respect to panel 146. In this case, an inner edge 150 of each sliding panel 136 moves along panel 146 as sliding panels 136 are hinged into an angled arrangement with respect to panel 146. For example, dotted line 152 indicates the position of inner edge 150 on the left side of height adjustment device 24 in the level position shown in FIG. 23A, while dotted line 154 indicates the position of the same inner edge 150 in the lowered position shown in FIG. 23B. The distance between dotted lines 152, 154 represents movement of inner edge 150 along panel 146 to accommodate lowering height adjustment device 24 to the position shown in FIG. 23B. An optional overlapping panel 156 may be coupled to one or both sliding panels 136 and panel 146 (e.g., via a hinge 134) to help ease the junction between sliding panel 136 and panel 146 for a smoother entrance for the aircraft into trench 68. Effectively, overlapping panel 156 may create a smoother, multi-segmented ramp leading down into trench 68. In some examples, an outer edge 164 of overlapping panel 156 may be coupled to sliding panel 136 via hinge 134, while an inner edge 162 of overlapping panel 156 slides along panel 146 during transitioning of height adjustment device 24 between the two configurations shown in FIGS. 23A and 23B. In this example, dotted line 160 indicates the position of inner edge 162 in the level configuration shown in FIG. 23A, while dotted line 158 indicates the position of inner edge 162 in the lowered configuration shown in FIG. 23B.

Figure 24A:
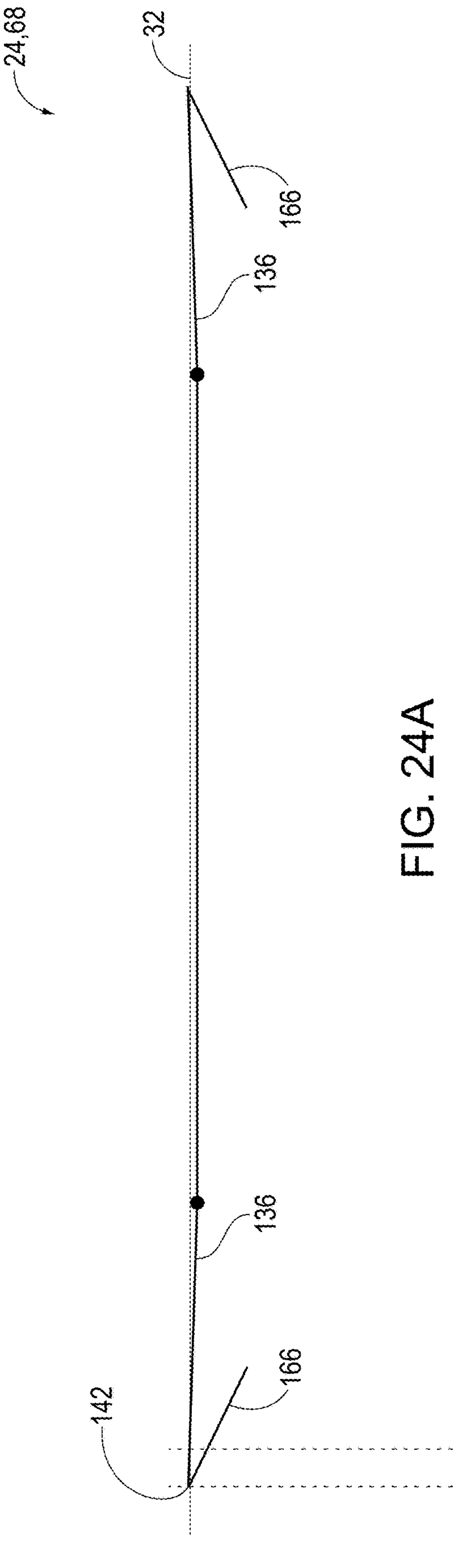
FIGS. 24A-B are side elevation schematic representations of examples of hinged height adjustment devices shown in a level position (FIG. 24A) and a lowered position (FIG. 24B).
Figure 24B:
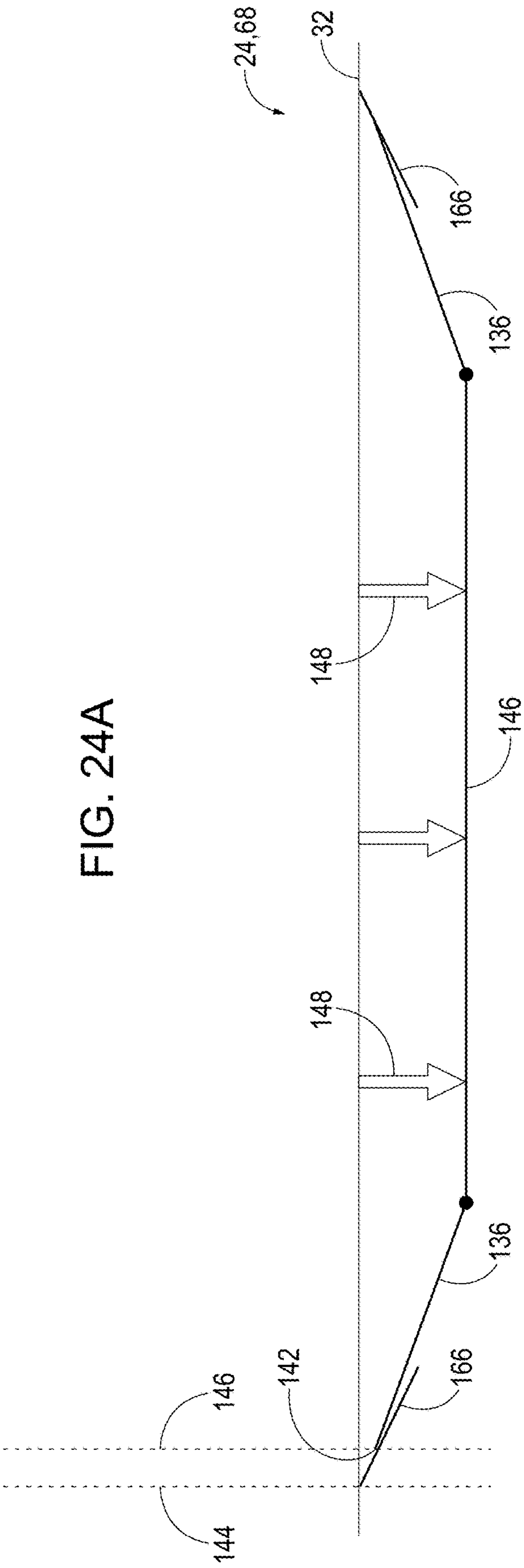

FIGS. 24A and 24B show an example of height adjustment device 24 similar to that shown in FIGS. 23A-23B, in which panels 136, 146 of height adjustment device 24 are lowered into a trench or pit formed in the airport apron, such that panels 136, 146 are lowered below ground surface 32 in the lowered configuration shown in FIG. 24B. The contour of the pit formed in the airport apron is partially represented at 166. In this example, outer edges 142 of sliding panels 136 slide down into the pit (e.g., slide along contour 166) as height adjustment device 24 is transitioned between the configurations shown in FIGS. 24 and 24B. Dotted line 144 indicates the position of outer edge 142 of sliding panel 136 on the left side of height adjustment device 24 in the level configuration shown in FIG. 24A, while dotted line 146 indicates the position of the same outer edge 142 in the lowered configuration shown in FIG. 24B.

Figure 25:
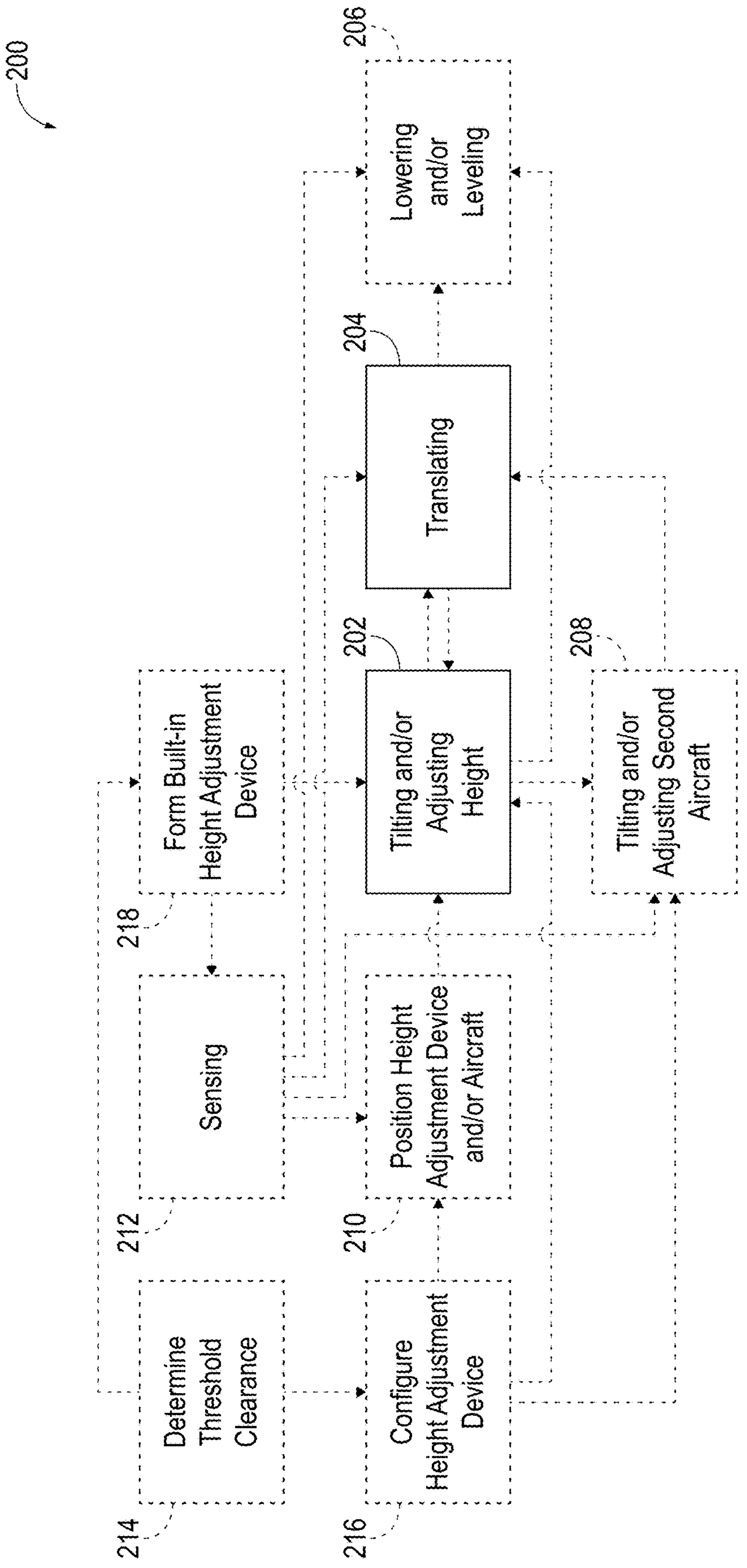
FIG. 25 is a schematic flowchart diagram of methods of docking or parking an aircraft using one or more height adjustment devices according to the present disclosure.

FIG. 25 schematically provides a flowchart that represents illustrative, non-exclusive examples of methods 200 according to the present disclosure. In FIG. 25, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 25 are not limiting and other methods and steps are within the scope of the present disclosure, including methods having greater than or fewer than the number of steps illustrated, as understood from the discussions herein.

Methods 200 of docking or parking or otherwise positioning an aircraft generally include tilting and/or adjusting a height of at least a portion of a first aircraft via a height adjustment device (e.g., height adjustment device 24) at 202. Methods 200 may include translating the first aircraft with respect to one or more other aircraft while the first aircraft is engaged with the height adjustment device, at 204, such that the first aircraft is tilted or has an adjusted height while the first aircraft is moved with respect to the other (e.g., second) aircraft at 204. After translating the first aircraft to a desired or final position in which the first aircraft's wings are clear of the adjacent aircraft(s)' wing(s) at 204, the first aircraft may be leveled and/or lowered with respect to the other aircraft, at 206, such that the first aircraft may be parked at the airport gate in a level position and/or a position in which the first aircraft is not elevated above the ground surface of the airport or other location where the first aircraft is positioned. In this manner, methods 200 may enable parking the first aircraft in an airport gate adjacent to a second gate where the second aircraft is parked, where the respective wingspans of the aircraft relative to the gates' sizes would not otherwise allow these aircraft to be parked next to each other because of wing interference without using disclosed height adjustment devices.

In some methods 200, translating the first aircraft at 204 includes transitioning the first aircraft from an entering position to a final position, where in the entering position the first aircraft is located outside of a first airport gate, in the final position the first aircraft is parked within the first airport gate, the second aircraft is parked in a second airport gate adjacent to the first airport gate, and a first wingspan of the first aircraft and a second wingspan of the second aircraft are such that the respective sizes of the first airport gate and the second airport gate relative to the first wingspan and the second wingspan would preclude parking the first aircraft at the first airport gate while the second aircraft is parked in the second airport gate without performing tilting and/or adjusting at 202.

Tilting and/or adjusting the height of the first aircraft at 202 may include tilting the first aircraft sufficiently such that an inboard section of the first aircraft clears a wing tip of the second aircraft while the first aircraft is translated past the second aircraft at 204. Additionally or alternatively, tilting and/or adjusting the height of the first aircraft at 202 may include tilting the first aircraft through a plurality of different tilt angles that increase from zero degrees to a maximum tilt angle, and then decrease again back to zero degrees. The maximum tilt angle is at least 2 degrees, at least 4 degrees, at least 6 degrees, and/or at least 8 degrees, in some methods 200. Methods 200 may include translating the first aircraft at 204 at the same time as tilting and/or adjusting the height of the first aircraft at 202 and/or lowering and/or leveling the first aircraft at 206. In a specific example, tilting and/or adjusting the height of the first aircraft at 202 includes tilting the first aircraft to a tilt angle of at least between 2-4 degrees while translating the first aircraft at 204, and then tilting the first aircraft to a tilt angle of at least between 6-8 degrees at 202 while continuing to translate the first aircraft at 204. After the first wing of the first aircraft has cleared a second wing of the second aircraft during the translating the first aircraft at 204, lowering and/or leveling the first aircraft at 206 may include decreasing the tilt angle of the first aircraft to less than 6 degrees (optionally while the first aircraft continues to be translated at 204, or once the aircraft has been parked or positioned at the final position), then lowering and/or leveling the first aircraft at 206 may include decreasing the tilt angle of the first aircraft to less than 4 degrees after decreasing the tilt angle to less than 6 degrees (optionally while the first aircraft continues to be translated at 204, or once the aircraft has been parked or positioned at the final position), then lowering and/or leveling the first aircraft at 206 may include decreasing the tilt angle of the first aircraft to less than 2 degrees after decreasing the tilt angle to less than 4 degrees (optionally while the first aircraft continues to be translated at 204, or once the aircraft has been parked or positioned at the final position), then lowering and/or leveling the first aircraft at 206 may include decreasing the tilt angle of the first aircraft to less about zero degrees after decreasing the tilt angle to less than 2 degrees (optionally while the first aircraft continues to be translated at 204, or once the aircraft has been parked or positioned at the final position).

In some examples, methods 200 include tilting and/or adjusting a second height of at least a portion of the second aircraft via a second height adjustment device, at 208, in addition to tilting and/or adjusting the height of the first aircraft at 202. Tilting and/or adjusting the heights of the first and/or second aircraft at 202 and/or 208 each may include lifting or lowering one or both sides of the respective aircraft. In some examples, height adjustment devices may work differently on different adjacent aircraft. For example, the first aircraft may be tilted at 202 and the second adjacent aircraft may be lifted at 208, or the first aircraft may be lifted at 202 and the second adjacent aircraft may be tilted at 208.

Methods 200 may further include positioning the aircraft to align an engagement portion (e.g., an upper surface of height adjustment device, such as an engagement portion 94 of height adjustment device 24 as shown in FIG. 21) of the height adjustment device with a main landing gear on at least one side of the first aircraft, at 210. For example, a tug may be used to position the aircraft at 210, and/or the main landing gear of the aircraft may be laterally aligned with the height adjustment device. In some examples, positioning the aircraft at 210 into engagement with the height adjustment device is performed autonomously. Some methods 200 also include forming one or more built-in height adjustment devices in an airport apron at 218, such as one or more troughs, trenches, recesses, ramps, mounds, hills, and/or projections. Methods 200 may include sensing the position of the first aircraft at 212, which data may be used to pull or push the first aircraft onto or otherwise in engagement with the height adjustment device. For example, sensing the position of the first aircraft 212 may inform the positioning of the aircraft at 210, the tilting, lowering, and/or lifting of the first aircraft at 202, the translating the first aircraft, at 204, and/or the lowering and/or leveling of the first aircraft at 206.

Additionally or alternatively, methods 200 may include determining a threshold vertical clearance between a first wing of the first aircraft and a second wing of the second aircraft at 214, and configuring the height adjustment device at 216 to provide the determined threshold vertical clearance between the first wing and the second wing during the translating the first aircraft with respect to the second aircraft at 204. In some examples, configuring the height adjustment device at 216 includes adjusting a device height of the height adjustment device such that the height adjustment device is configured to handle a different arrangement of the first aircraft and the second aircraft.

Illustrative, non-exclusive examples of inventive subject matter according to the present disclosure are described in the following enumerated paragraphs:

A1. A height adjustment device (24) configured to temporarily and selectively adjust a height of at least a portion of an aircraft (26) while the aircraft (26) is engaged with the height adjustment device (24), wherein the height adjustment device (24) is at least partially integrated into airport infrastructure and/or an apron (33) of an airport (35) where the aircraft (26) is located.

A2. The height adjustment device (24) of paragraph A1, wherein the height adjustment device (24) is configured to adjust a vertical distance (28) between a point (30) on a wing (20) of the aircraft (26) and a ground surface (32) or a floor surface on which a portion of the aircraft (26) is positioned when the aircraft (26) is engaged with the height adjustment device (24).

A3. The height adjustment device (24) of any of paragraphs A1-A2, wherein the height adjustment device (24) is configured to tilt the aircraft (26) such that a first wing (**20*a*) of the aircraft (26) is vertically offset from a second wing (20*b*) of the aircraft (26) while the aircraft (26) is engaged with the height adjustment device (24**).

A4. The height adjustment device (24) of any of paragraphs A1-A3, wherein the height adjustment device (24) is configured to guide the aircraft (26) to transition the aircraft (26) from an entering position to a final position.

A5. The height adjustment device (24) of paragraph A4, wherein the entering position is outside of an airport gate parking area (10), wherein the final position is in the airport gate parking area (10).

A6. The height adjustment device (24) of paragraph A4 or A5, wherein the height adjustment device (24) is configured to position the aircraft (26) in a level orientation in the final position.

A7. The height adjustment device (24) of any of paragraphs A1-A6, wherein the height adjustment device (24) is configured to temporarily and selectively adjust the height of at least the portion of the aircraft (26) relative to a/the ground surface (32) or a/the floor supporting the aircraft (26) when the aircraft (26) is engaged with the height adjustment device (24).

A8. The height adjustment device (24) of any of paragraphs A1-A7, wherein the height adjustment device (24) is configured to temporarily and selectively adjust the height of at least the portion of the aircraft (26) relative to a second aircraft (34) when the aircraft (26) is engaged with the height adjustment device (24).

A9. The height adjustment device (24) of any of paragraphs A1-A8, wherein the height adjustment device (24) is configured to prevent interference with an adjacent aircraft (34) while the aircraft (26) travels such that a first wing (**20*a*) of the aircraft (26) passes by an adjacent wing (20*c*) of the adjacent aircraft (34**).

A10. The height adjustment device (24) of any of paragraphs A1-A9, wherein the height adjustment device (24) is configured to tilt the aircraft (26) at a plurality of different tilt angles as the aircraft (26) moves between an/the entering position and a/the final position.

A11. The height adjustment device (24) of any of paragraphs A1-A10, wherein the height adjustment device (24) is configured to lift or lower a first side of the aircraft (26), but not a second side of the aircraft (26) while the aircraft (26) is engaged with the height adjustment device (24).

A12. The height adjustment device (24) of any of paragraphs A1-A10, wherein the height adjustment device (24) is configured to lift or lower both a right side and a left side of the aircraft (26) while the aircraft (26) is engaged with the height adjustment device (24).

A13. The height adjustment device (24) of any of paragraphs A1-A12, wherein the height adjustment device (24) is configured to provide sufficient vertical clearance to allow the aircraft (26) to park at an airport gate (10) that spaced more closely to an adjacent airport gate (10) than a wingspan of the aircraft (26).

A14. The height adjustment device (24) of any of paragraphs A1-A13, wherein the height adjustment device (24) is configured to tilt one side of the aircraft (26) while the aircraft (26) is engaged with the height adjustment device (24).

A15. The height adjustment device (24) of any of paragraphs A1-A14, wherein the height adjustment device (24) is configured to tilt both sides of the aircraft (26) while the aircraft (26) is engaged with the height adjustment device (24).

A16. The height adjustment device (24) of any of paragraphs A1-A15, wherein the height adjustment device (24) is autonomous.

A17. The height adjustment device (24) of any of paragraphs A1-A16, wherein the height adjustment device (24) comprises at least one motor configured to operate the height adjustment device (24) such that the aircraft (26) passively engages with the height adjustment device (24).

A18. The height adjustment device (24) of any of paragraphs A1-A17, wherein the height adjustment device (24) comprises at least one sensor (58).

A19. The height adjustment device (24) of paragraph A18, wherein the at least one sensor (58) comprises at least one ultrasonic sensor.

A20. The height adjustment device (24) of paragraph A18 or A19, wherein the at least one sensor (58) comprises an aircraft sensor (48) configured to be positioned on the aircraft (26) to facilitate positioning of the aircraft (26) with respect to an engagement portion (90) of the height adjustment device (24).

A21. The height adjustment device (24) of any of paragraphs A18-A20, wherein the at least one sensor (58) comprises a ground sensor positioned in or on a ground surface (32) on which the aircraft (26) is supported, to facilitate positioning of the aircraft (26) with respect to a/the engagement portion (90) of the height adjustment device (24).

A22. The height adjustment device (24) of any of paragraphs A18-A21, wherein the at least one sensor (58) comprises a floor sensor positioned in or on a floor surface on which the aircraft (26) is supported, to facilitate positioning of the aircraft (26) with respect to a/the engagement portion (90) of the height adjustment device (24).

A23. The height adjustment device (24) of any of paragraphs A1-A22, wherein the height adjustment device (24) comprises at least one jack or lift configured to vertically lift at least a portion of the aircraft (26) above a/the ground surface (32) or a/the floor surface supporting the aircraft (26).

A23.1. The height adjustment device (24) of any of paragraphs A1-A23, wherein the height adjustment device (24) is configured to vertically lift at least a portion of the aircraft (26) above a/the ground surface (32) or a/the floor surface supporting the aircraft (26) without tilting the aircraft (26).

A24. The height adjustment device (24) of any of paragraphs A1-A23.1, wherein the height adjustment device (24) is configured to elevate or lower the entire aircraft (26) relative to a/the ground surface (32) or a/the floor surface supporting the aircraft (26).

A25. The height adjustment device (24) of any of paragraphs A1-A24, wherein the height adjustment device (24) comprises a control system (50) configured to prevent collisions between the aircraft (26), an/the adjacent aircraft (34), and/or one or more components of the height adjustment device (24).

A26. The height adjustment device (24) of any of paragraphs A1-A25, wherein the height adjustment device (24) is configured to tilt the aircraft (26) at a/the tilt angle of 0 degrees, up to about 1 degree, up to about 2 degrees, up to about 3 degrees, up to about 4 degrees, up to about 5 degrees, up to about 6 degrees, up to about 7 degrees, up to about 8 degrees, up to about 9 degrees, and/or up to about 10 degrees.

A27. The height adjustment device (24) of any of paragraphs A1-A26, wherein the height adjustment device (24) is configured to create a predetermined threshold vertical clearance between a first wing (20*a*) of the aircraft (26) and an/the adjacent wing (20*c*) of an/the adjacent aircraft (34).

A28. The height adjustment device (24) of paragraph A27, wherein the predetermined threshold vertical clearance is at least 1 inch, at least 3 inches, at least 5 inches, at least 7 inches, at least 10 inches, and/or at least a foot.

A29. The height adjustment device (24) of paragraph A27 or A28, wherein the predetermined threshold vertical clearance is selected based at least in part on a tolerance of wing flex of the wing of the aircraft (26) and of the adjacent wing (20*c*) of the adjacent aircraft (34).

A30. The height adjustment device (24) of any of paragraphs A1-A29, wherein the height adjustment device (24) comprises a trench (68), trough (68), or recess (68), formed in the apron (33) of the airport (35).

A31. The height adjustment device (24) of paragraph A30, wherein the trench (68), trough (68), or recess (68) has a footprint or surface area positioned lower than a surrounding ground surface (32) or floor surface, wherein the footprint or surface area is large enough to receive at least one truck of at least one landing gear (60) of the aircraft (26).

A32. The height adjustment device (24) of paragraph A31, wherein the footprint or surface area is large enough to receive all landing gear (60) of the aircraft (26).

A33. The height adjustment device (24) of any of paragraphs A30-A32, wherein a bottom elevation of the trench (68), trough (68), or recess (68) is adjustable.

A34. The height adjustment device (24) of any of paragraphs A30-A33, wherein the trench (68), trough (68), or recess (68) is configured to position the aircraft (26) at a lower elevation in a/the final position than the aircraft (26) was positioned at in a/the entering position.

A35. The height adjustment device (24) of any of paragraphs A1-A34, wherein the height adjustment device (24) comprises a ramp (25).

A36. The height adjustment device (24) of paragraph A35, wherein the ramp (25) is positioned within and/or formed in or on a/the trench (68), trough (68), or recess (68) formed in the apron (33) of the airport (35).

A37. The height adjustment device (24) of paragraph A36, wherein the ramp (25) is configured to be selectively moved up and down within the trench (68), trough (68), or recess (68).

A38. The height adjustment device (24) of any of paragraphs A35-A37, wherein the ramp (25) is built in to the apron (33) of the airport (35).

A39. The height adjustment device (24) of any of paragraphs A35-A38, wherein the ramp (25) is removably positioned within an indent formed in the apron (33) of the airport (35).

A40. The height adjustment device (24) of any of paragraphs A35-A39, wherein the ramp (25) comprises:

a first angled portion (74);

a second angled portion (76); and a level portion (78) positioned between the first angled portion (74) and the second angled portion (78), wherein a width (80) of the ramp (25) is sufficient to receive a/the truck of a main landing gear (60) on one side of the aircraft (26).

A41. The height adjustment device (24) of any of paragraphs A35-A40, wherein the ramp (25) is configured to receive at least a portion of the aircraft (26) and then actively lift the aircraft (26) up off of a/the ground surface (32) or a/the floor surface supporting the aircraft (26) in a/the entering position.

A41.1. The height adjustment device (24) of any of paragraphs A35-A41, wherein the ramp (25) is configured to raise the aircraft (26) in a first airport gate parking spot area (10) vertically above a/the ground surface (32) on which a second aircraft (34) is parked in a second airport gate parking area adjacent the first airport gate parking area (10).

A42. The height adjustment device (24) of any of paragraphs A1-A41.1, wherein the height adjustment device (24) comprises at least one actuating piston (120) in a main gear strut of the aircraft (26), wherein the at least one actuating piston (120) is configured to selectively and reversibly change a height of the main gear strut.

A43. The height adjustment device (24) of any of paragraphs A1-A42, wherein the height adjustment device (24) comprises:

a first actuating piston (120) in a first main gear strut of the aircraft (26);

a second actuating piston (120') in a second main gear strut of the aircraft (26); and an interconnect (122) between the first actuating piston (120) and the second actuating piston (120'), wherein the interconnect (122) is configured to leverage the first actuating piston (120) and the second actuating piston (120') to minimize power and energy required to adjust the height of the aircraft (26).

A44. The height adjustment device (24) of paragraph A43, wherein the interconnect (122) is mechanical, hydraulic, and/or pneumatic.

A45. The height adjustment device (24) of any of paragraphs A1-A44, comprising specialized infrastructure for a plurality of different type of aircraft.

A46. The height adjustment device (24) of any of paragraphs A1-A45, wherein the height adjustment device (24) is configured to adjust sill heights (132) of different types of aircraft.

A47. The height adjustment device (24) of any of paragraphs A1-A46, comprising an in-ground pump (124) or actuator (124) configured to selectively raise and lower aircraft landing gear.

A48. The height adjustment device (24) of paragraph A47, wherein the in-ground pump (124) or actuator (124) controls a first landing gear support structure and a second landing gear support structure.

A49. The height adjustment device (24) of paragraph A48, wherein the in-ground pump (124) or actuator (124) is configured to raise the first landing gear support structure to raise one side of the aircraft (26), while simultaneously lowering the second landing gear support structure to lower an opposite side of the aircraft (26).

A50. The height adjustment device (24) of paragraph A48 or A49, wherein the first landing gear support structure and the second landing gear support structure are interconnected via a hydraulic, pneumatic, or mechanical interconnect.

A51. The height adjustment device (24) of any of paragraphs A47-A50, wherein the in-ground pump (124) or actuator (124) is at least partially gravity-powered.

A52. The height adjustment device (24) of any of paragraphs A1-A51, further comprising a communication link (46) between the aircraft (26) and the height adjustment device (24) configured to detect and prevent potential collisions, warn flight crew, alert ground crew, engage autobrake, actuate tilting, lifting, or lowering, and/or facilitate precise positioning of the aircraft (26) with respect to the height adjustment device (24).

A53. The height adjustment device (24) of any of paragraphs A1-A52, wherein the height adjustment device (24) is configured to accommodate different types of aircraft with different lengths of landing gear.

A54. The height adjustment device (24) of any of paragraphs A1-A53, wherein the height adjustment device (24) comprises a fail safe stop sensor configured to stop movement of the aircraft (26) via the height adjustment device (24) if an impending collision is detected.

A55. The height adjustment device (24) of any of paragraphs A1-A54, wherein the height adjustment device (24) is configured to passively engage and align the aircraft (26).

A56. The height adjustment device (24) of any of paragraphs A1-A55, wherein the height adjustment device (24) is configured to actively engage and align the aircraft (26).

A57. The height adjustment device (24) of any of paragraphs A1-A56, wherein the height adjustment device (24) is configured to laterally align a/the truck of a/the main landing gear (60) of the aircraft (26).

A58. The height adjustment device (24) of any of paragraphs A1-A57, wherein the height adjustment device (24) comprises a plurality of rollers having a longitudinal axis aligned with a direction of travel of a/the truck of a/the main landing gear of the aircraft (26), wherein the plurality of rollers are configured to laterally align the truck of the landing gear with a desired location, or within angled wall guides of the height adjustment device (24).

A59. The height adjustment device (24) of any of paragraphs A1-A58, wherein the height adjustment device (24) is configured to adjust the height of the aircraft (26) relative to a/the ground surface (32) or a/the floor surface without tilting the aircraft (26).

A60. The height adjustment device (24) of any of paragraphs A1-A59, wherein the height adjustment device (24) is adjustable such that the height adjustment device (24) is configured to adjust the aircraft (26) to a plurality of different heights.

A61. The height adjustment device (24) of any of paragraphs A1-A60, wherein the height adjustment device (24) is configured to accommodate aircraft (26) with different lengths of landing gear.

A62. The height adjustment device (24) of any of paragraphs A1-A61, wherein the height adjustment device (24) comprises a warning system configured to detect potential collisions between the aircraft (26) and a second aircraft (34) or other object, and wherein the warning system is further configured to warn flight crew, alert ground crew, engage an auto-brake, and/or actuate tilting of the aircraft (26) in response to any detected potential collisions.

A63. The height adjustment device (24) of paragraph A62, wherein the warning system comprises lights, flashing lights, sounds, wireless communication, and/or navigation systems.

A64. The height adjustment device (24) of any of paragraphs A1-A63, wherein the height adjustment device (24) comprises one or more hinges (134) and/or one or more sliding panels (136).

B1. A system (42) for close gate spacing of large span aircraft, the system (42) comprising the height adjustment device (24) of any of paragraphs A1-A64.

B2. The system (42) of paragraph B1, comprising a plurality of height adjustment devices (24), each height adjustment device (24) of the plurality of height adjustment devices (24) being the height adjustment device (24) of any of paragraphs A1-A64.

B3. The system (42) of paragraph B2, wherein the plurality of height adjustment devices (24) comprises a plurality of different types and/or sizes of height adjustment devices (24).

B4. The system (42) of paragraph B2 or B3, wherein the plurality of height adjustment devices (24) are spaced apart in a plurality of different locations of the airport (35).

B5. The system (42) of any of paragraphs B2-B4, further comprising a tug (44), or pushback tractor, configured to position the aircraft (26) in or on the height adjustment device (24).

B6. The system (42) of any of paragraphs B1-B5, further comprising one or more markings (37) on the apron (33) configured to guide the aircraft (26) into or onto the height adjustment device (24).

B7. The system (42) of any of paragraphs B1-B6, further comprising at least one aircraft sensor (48) positioned on or within the aircraft (26), wherein the at least one aircraft sensor (48) is configured to measure and/or provide information regarding the height, orientation, and/or position of one or more points on the aircraft (26), and/or to measure or provide information regarding a distance between one or more points on the aircraft (26) and an/the adjacent aircraft (34), the height adjustment device (24), or another object.

B8. The system (42) of any of paragraphs B1-B7, wherein the system (42) is automated and/or autonomous.

B9. The system (42) of any of paragraphs B1-B8, further comprising a communication link (46) between the height adjustment device (24) and one or more tugs (44) configured to move the aircraft (26) relative to the height adjustment device (24).

B10. The system (42) of any of paragraphs B1-B9, wherein the height adjustment device (24) comprises a first height adjustment device (**24*a*), and wherein the system (42) further comprises a second height adjustment device (24*b*), wherein the second height adjustment device (24*b*) is the height adjustment device (24**) of any of paragraphs A1-A64.

B11. The system (42) of paragraph B10, wherein the first height adjustment device (**24*a*) is configured to tilt a first aircraft (26), and wherein the second height adjustment device (24*b*) is configured to tilt a second aircraft (34**).

B12. The system (42) of paragraph B11, wherein the first height adjustment device (**24*a*) is configured to tilt the first aircraft (26) at a first angle (62), and wherein the second height adjustment device (24*b*) is configured to tilt the second aircraft (34) at a second angle (66**).

B13. The system (42) of paragraph B12, wherein the first angle (62) is greater than the second angle (66).

B14. The system (42) of paragraph B13, wherein the first angle (62) is at least about 6 degrees, and wherein the second angle (66) is about 2 degrees.

B15. The system (42) of any of paragraphs B12-B14, wherein the second aircraft (34) is parked at a second airport gate (10), and wherein the first aircraft (26) is entering a first airport gate (10) adjacent the second airport gate (10).

C1. A kit (54), comprising a plurality of height adjustment devices (24), each height adjustment device (24) of the plurality of height adjustment devices (24) being the height adjustment device (24) of any of paragraphs A1-A64.

C2. The kit (54) of paragraph C1, wherein at least a first height adjustment device (24) of the plurality of height adjustment devices (24) is configured to engage a first type of aircraft, wherein at least a second height adjustment device (24) of the plurality of height adjustment devices (24) is configured to engage a second type of aircraft, and wherein the first type of aircraft is different from the second type of aircraft.

C3. The kit (54) of paragraph C1 or C2, wherein at least one height adjustment device (24) of the plurality of height adjustment devices (24) is configured for use in a first arrangement of adjacent aircraft types, and wherein at least one height adjustment device (24) of the plurality of height adjustment devices (24) is configured for use in a second arrangement of adjacent aircraft types, wherein the second arrangement is different from the first arrangement.

D1. An airport (35) comprising the height adjustment device (24) of any of paragraphs A1-A64.

D2. The airport (35) of paragraph D1, comprising a plurality of trenches (68), troughs (68), recesses (68), and/or ramps (25) built into the apron (33).

D3. The airport (35) of paragraph D1 or D2, comprising a trench (68), trough (68), or recess (68) built in a first gate parking area (10), and a level ground surface (32) in a second gate parking area (10) adjacent the first gate parking area (10).

D4. The airport (35) of any of paragraphs D1-D3, comprising a trench (68), a trough (68), or a recess (68) in a/the first gate parking area (10), and a ramp (25), a jack, and/or a lift in a/the second gate parking area (10) adjacent the first gate parking area (10).

D5. The airport (35) of any of paragraphs D1-D4, comprising specialized infrastructure for a plurality of different type of aircraft, such that the height adjustment device (24) is configured to create substantially similar sill heights (132) across different types of aircraft.

E1. A method (200), comprising:

tilting and/or adjusting (202) a height of at least a portion of a first aircraft (26) via the height adjustment device (24) of any of paragraphs A1-A64.

E1.1. The method (200) of paragraph E1, further comprising translating (204) the first aircraft (26) with respect to a second aircraft (34) while the first aircraft (26) is engaged with the height adjustment device (24), such that the first aircraft (26) is tilted or has an adjusted height while the first aircraft (26) is moved with respect to the second aircraft (34).

E2. The method (200) of paragraph E1 or E1.1, further comprising raising or lowering (206) the first aircraft (26) after the translating (204) the first aircraft (26) with respect to the second aircraft (34).

E3. The method (200) of any of paragraphs E1-E2, further comprising leveling (206) the first aircraft (26) after the translating (204) the first aircraft (26) with respect to the second aircraft (34).

E4. The method (200) of any of paragraphs E1-E3, wherein the translating (204) the first aircraft (26) with respect to the second aircraft (34) is performed until a first wing (20*a*) of the first aircraft (26) is moved past a second wing (20*c*) of the second aircraft (34).

E5. The method (200) of any of paragraphs E1-E4, wherein the second aircraft (34) is parked in a second airport gate (10) during the translating (204) the first aircraft (26), and wherein the translating (204) the first aircraft (26) comprises parking the first aircraft (26) in a first airport gate (10) adjacent the second airport gate (10).

E6. The method (200) of any of paragraphs E1-E5, further comprising tilting and/or adjusting (208) a second height of at least a portion of the second aircraft (34) via a second height adjustment device (24) according to any of paragraphs A1-A64.

E7. The method (200) of any of paragraphs E1-E6, wherein the tilting and/or adjusting (202) the height comprises lifting or lowering one side of the first aircraft (26).

E8. The method (200) of any of paragraphs E1-E7, wherein the tilting and/or adjusting (202) the height comprises lifting or lowering both sides of the first aircraft (26).

E9. The method (200) of any of paragraphs E1-E8, wherein the tilting and/or adjusting (202) the height comprises tilting the first aircraft (26) and lifting the first aircraft (26) with respect to the second aircraft (34).

E10. The method (200) of any of paragraphs E1-E9, wherein the tilting and/or adjusting (202) the height comprises lifting and/or tilting the first aircraft (26) with respect to the second aircraft (34), and wherein the method (200) further comprises lowering and/or tilting the second aircraft (34) during the translating (204) of the first aircraft (26).

E10.1. The method (200) of any of paragraphs E1-E10, wherein the tilting and/or adjusting (202) the height comprises lowering and/or tilting the first aircraft (26) with respect to the second aircraft (34), and wherein the method (200) further comprises lifting and/or tilting (208) the second aircraft (34) during the translating (204) of the first aircraft (26).

E11. The method (200) of any of paragraphs E1-E10.1, further comprising aligning an/the engagement portion (90) of the height adjustment device (24) with a/the truck of a/the main landing gear on at least one side of the first aircraft (26).

E12. The method (200) of any of paragraphs E1-E11, further comprising sensing (212) the position of the first aircraft (26) and pulling or pushing the first aircraft (26) onto the height adjustment device (24).

E13. The method (200) of any of paragraphs E1-E12, wherein the translating (204) the first aircraft (26) comprises transitioning the first aircraft (26) from an entering position to a final position, wherein in the entering position the first aircraft (26) is located outside of a first airport gate (10), wherein in the final position the first aircraft (26) is parked within the first airport gate (10), wherein the second aircraft (34) is parked in a second airport gate (10) adjacent to the first airport gate (10), and wherein a first wingspan of the first aircraft (26) and a second wingspan of the second aircraft (34) are such that the respective sizes of the first airport gate (10) and the second airport gate (10) relative to the first wingspan and the second wingspan would preclude parking the first aircraft (26) at the first airport gate (10) while the second aircraft (34) is parked in the second airport gate (10) without performing the tilting and/or adjusting (202).

E14. The method (200) of any of paragraphs E1-E13, wherein the tilting and/or adjusting (202) comprises tilting the first aircraft (26) sufficiently such that an inboard section of the first aircraft (26) clears a wing tip of the second aircraft (34) while the first aircraft (26) is translated past the second aircraft (34).

E15. The method (200) of any of paragraphs E1-E14, wherein the tilting and/or adjusting (202) comprises tilting the first aircraft (26) through a plurality of different tilt angles that increase from zero degrees to a maximum tilt angle, and then decrease again back to zero degrees.

E16. The method (200) of paragraph E15, wherein the maximum tilt angle is at least 2 degrees, at least 4 degrees, at least 6 degrees, and/or at least 8 degrees.

E17. The method (200) of any of paragraphs E1-E16, wherein the tilting and/or adjusting comprises:

tilting the first aircraft (26) to at least between 2-4 degrees;

tilting the first aircraft (26) to at least between 6-8 degrees;

decreasing a/the tilt angle of the first aircraft (26) to less than 6 degrees after a/the first wing (20*a*) of the first aircraft (26) has cleared a/the second wing of the second aircraft (34) during the translating the first aircraft (26);

decreasing the tilt angle of the first aircraft (26) to less than 4 degrees after decreasing the tilt angle to less than 6 degrees;

decreasing the tilt angle of the first aircraft (26) to less than 2 degrees after decreasing the tilt angle to less than 4 degrees; and decreasing the tilt angle of the first aircraft (26) to about zero degrees after decreasing the tilt angle to less than 2 degrees.

E18. The method (200) of any of paragraphs E1-E17, further comprising:

determining (214) a threshold vertical clearance between a/the first wing (20*a*) of the first aircraft (26) and a/the second wing (20*c*) of the second aircraft (34); and configuring (216) the height adjustment device (24) to provide the threshold vertical clearance between the first wing (20*a*) and the second wing (20*c*) during the translating (204) the first aircraft (26) with respect to the second aircraft (34).

E19. The method (200) of any of paragraphs E1-E18, further comprising adjusting a device height of the height adjustment device (24) such that the height adjustment device (24) is configured to handle a different arrangement of the first aircraft (26) and the second aircraft (34).

E20. The method (200) of any of paragraphs E1-E19, further comprising laterally aligning a/the truck of a/the main landing gear of the aircraft with the height adjustment device (24).

E21. The method (200) of any of paragraphs E1-E20, further comprising forming (218) one or more trenches (68), troughs (68), or recesses (68) in the apron (33) of the airport (35) to form one or more height adjustment devices (24).

E22. The method (200) of any of paragraphs E1-E21, further comprising forming one or more hills (25), ramps (25), mounds (25), or projections (25) in the apron (33) of the airport (35) to form one or more height adjustment devices (24).

F1. The use of the height adjustment device (24) of any of paragraphs A1-A64 to create vertical clearance between wings (20) of adjacent aircraft (26, 34).

F2. The use of the height adjustment device (24) of any of paragraphs A1-A64 to enable a pair of aircraft (26, 34) to be parked in adjacent airport gates (10), wherein each respective airport gate (10) of the adjacent airport gates (10) is narrower that a respective wingspan of each respective aircraft of the pair of aircraft (26, 34).

F3. The use of the height adjustment device (24) of any of paragraphs A1-A64 to even out sill heights (132) of different sizes of aircraft and/or to reduce a sill height (132) of an aircraft.

F4. The use of the system (42) of any of paragraphs B1-B15 to create vertical clearance between wings (20) of adjacent aircraft (26, 34).

F5. The use of the system (42) of any of paragraphs B1-B15 to enable a pair of aircraft (26, 34) to be parked in adjacent airport gates (10), wherein each respective airport gate (10) of the adjacent airport gates (10) is narrower that a respective wingspan of each respective aircraft of the pair of aircraft (26, 34).

F6. The use of the system (42) of any of paragraphs B1-B15 to even out sill heights (132) of different sizes of aircraft and/or to reduce a sill height (132) of an aircraft.

F7. The use of the kit (54) of any of paragraphs C1-C3 to create vertical clearance between wings of adjacent aircraft (26, 34).

F8. The use of the kit (54) of any of paragraphs C1-C3 to enable a pair of aircraft (26, 34) to be parked in adjacent airport gates (10), wherein each respective airport gate (10) of the adjacent airport gates (10) is narrower that a respective wingspan of each respective aircraft of the pair of aircraft (26, 34).

F9. The use of the kit (54) of any of paragraphs C1-C3 to even out sill heights (132) (132) of different sizes of aircraft and/or to reduce a sill height (132) of an aircraft.

A controller (e.g., control system 50) may be or include any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A height adjustment device configured to temporarily and selectively adjust a height of at least a portion of an aircraft while the aircraft is engaged with the height adjustment device, wherein the height adjustment device is at least partially integrated into an apron of an airport where the aircraft is located, wherein the height adjustment device is configured to guide the aircraft to transition the aircraft from an entering position to a final position, wherein the height adjustment device is configured to position the aircraft in a level orientation in the final position, and wherein the height adjustment device is configured to prevent interference with an adjacent aircraft while the aircraft travels such that a wing of the aircraft passes by an adjacent wing of the adjacent aircraft, wherein the height adjustment device is configured to tilt the aircraft such that the wing of the aircraft is vertically offset from an opposite wing of the aircraft while the aircraft is engaged with the height adjustment device while the aircraft travels such that the wing of the aircraft passes by the adjacent wing of the adjacent aircraft.

2. The height adjustment device according to claim 1, wherein the height adjustment device is configured to lower a first side of the aircraft, but not a second side of the aircraft while the aircraft is engaged with the height adjustment device.

3. The height adjustment device according to claim 1, wherein the height adjustment device is configured to lower both a right side and a left side of the aircraft while the aircraft is engaged with the height adjustment device.

4. The height adjustment device according to claim 1, wherein the height adjustment device comprises at least one sensor, wherein the at least one sensor comprises a ground sensor positioned in or on a ground surface on which the aircraft is supported to facilitate positioning of the aircraft with respect to an engagement portion of the height adjustment device.

5. The height adjustment device according to claim 1, wherein the height adjustment device comprises at least one lift configured to vertically lift at least a portion of the aircraft above a ground surface supporting the aircraft without tilting the aircraft.

6. The height adjustment device according to claim 1, comprising an in-ground actuator configured to selectively raise and lower aircraft landing gear, wherein the in-ground actuator controls a first landing gear support structure and a second landing gear support structure, and wherein the in-ground actuator is configured to raise the first landing gear support structure to raise one side of the aircraft while simultaneously lowering the second landing gear support structure to lower an opposite side of the aircraft.

7. The height adjustment device according to claim 6, wherein the first landing gear support structure and the second landing gear support structure are interconnected via a hydraulic, pneumatic, or mechanical interconnect, and wherein the in-ground actuator is at least partially gravity-powered.

8. A system for close gate spacing of large span aircraft, the system comprising:

a plurality of the height adjustment devices according to claim 1, wherein each height adjustment device of the plurality of height adjustment devices is configured to temporarily and selectively adjust a respective height of at least a respective first portion of a respective aircraft while the respective aircraft is engaged with a respective height adjustment device of the plurality of height adjustment devices, wherein the plurality of height adjustment devices are spaced apart in a plurality of different locations at an airport, and wherein each respective height adjustment device of the plurality of height adjustment devices is at least partially integrated into an apron of the airport;

a plurality of tugs, each tug being configured to position a respective aircraft on or in a respective height adjustment device of the plurality of height adjustment devices; and at least one aircraft sensor positioned on or within the aircraft, wherein the at least one aircraft sensor is configured to measure and/or provide information regarding the height, orientation, and/or position of one or more points on the aircraft, and/or to measure or provide information regarding a distance between one or more points on the aircraft and an adjacent aircraft or other object.

9. The system according to claim 8, wherein the plurality of height adjustment devices comprises a trench in a first gate parking area of the airport, and a ramp, a jack, and/or a lift in a second gate parking area adjacent the first gate parking area.

10. The system according to claim 8, further comprising a plurality of markings on the apron configured to guide the aircraft into engagement with a respective height adjustment device of the plurality of height adjustment devices.

11. A method, comprising:

adjusting a height of at least a portion of a first aircraft via a height adjustment device, wherein the height adjustment device is at least partially integrated into an apron of an airport where the first aircraft is located;

translating the first aircraft with respect to a second aircraft while the first aircraft is engaged with the height adjustment device, such that the first aircraft is tilted while the first aircraft is moved with respect to the second aircraft, wherein the translating the first aircraft with respect to the second aircraft is performed until a first wing of the first aircraft is moved past a second wing of the second aircraft; and leveling the first aircraft after the translating the first aircraft with respect to the second aircraft.

12. The method according to claim 11, wherein the translating the first aircraft comprises transitioning the first aircraft from an entering position to a final position, wherein in the entering position, the first aircraft is located outside of a first airport gate, wherein in the final position, the first aircraft is parked within the first airport gate, wherein the second aircraft is parked in a second airport gate adjacent to the first airport gate, and wherein a first wingspan of the first aircraft and a second wingspan of the second aircraft are such that the respective sizes of the first airport gate and the second airport gate relative to the first wingspan and the second wingspan would preclude parking the first aircraft at the first airport gate while the second aircraft is parked in the second airport gate without performing the adjusting the height, and wherein the method further comprises:

determining a threshold vertical clearance between a first wing of the first aircraft and a second wing of the second aircraft; and configuring the height adjustment device to provide the threshold vertical clearance between the first wing and the second wing during the translating the first aircraft with respect to the second aircraft.

13. The method according to claim 11, further comprising adjusting a second height of at least a portion of the second aircraft via a second height adjustment device, wherein the adjusting the second height of at least the portion of the second aircraft comprises one of lowering or raising the second aircraft.

14. A height adjustment device configured to temporarily and selectively adjust a height of at least a portion of an aircraft while the aircraft is engaged with the height adjustment device, wherein the height adjustment device is at least partially integrated into an apron of an airport where the aircraft is located, wherein the height adjustment device is configured to guide the aircraft to transition the aircraft from an entering position to a final position, wherein the height adjustment device is configured to position the aircraft in a level orientation in the final position, and wherein the height adjustment device is configured to prevent interference with an adjacent aircraft while the aircraft travels such that a wing of the aircraft passes by an adjacent wing of the adjacent aircraft, wherein the height adjustment device comprises a trench formed in the apron of the airport, wherein the trench has a footprint positioned lower than a surrounding ground surface, wherein the footprint is large enough to receive at least one truck of at least one landing gear of the aircraft, wherein the footprint is large enough to receive all landing gear of the aircraft, and wherein the trench is configured to position the aircraft at a lower elevation in the final position than the aircraft was positioned at in the entering position.

15. The height adjustment device according to claim 14, wherein a bottom elevation of the trench is adjustable.

16. The height adjustment device according to claim 14, wherein the height adjustment device comprises a ramp positioned within the trench.

17. The height adjustment device according to claim 16, wherein the ramp is configured to be selectively moved up and down within the trench.

18. The height adjustment device according to claim 14, wherein the height adjustment device is configured to lower the entire aircraft relative to a ground surface supporting the aircraft.

* * * * *